US012627449B2

(12) United States Patent　　　　(10) Patent No.:　US 12,627,449 B2
Pu et al.　　　　　　　　　　　　　　(45) Date of Patent:　May 12, 2026

(54) SYSTEMS, METHODS, AND DEVICES FOR DYNAMIC ADAPTION OF DIFFERENT ANTENNA CONFIGURATION COMMUNICATIONS

(71) Applicant: Apple Inc., Cupertino, CA (US)

(72) Inventors: Han Pu, Shanghai (CN); Lijie Zhang, Beijing (CN); Lele Cui, Beijing (CN); Kai Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 316 days.

(21) Appl. No.: 18/469,819

(22) Filed: Sep. 19, 2023

(65) Prior Publication Data

US 2024/0106610 A1　　Mar. 28, 2024

Related U.S. Application Data

(60) Provisional application No. 63/409,151, filed on Sep. 22, 2022.

(51) Int. Cl.
H04L 5/00　　　(2006.01)
(52) U.S. Cl.
CPC ................................... H04L 5/0053 (2013.01)
(58) Field of Classification Search
CPC .................................................... H04L 5/0553
See application file for complete search history.

(56) References Cited

U.S. PATENT DOCUMENTS

| | | | |
|---|---|---|---|
| 2012/0149411 A1 | 6/2012 | Miyoshi et al. | |
| 2012/0229358 A1* | 9/2012 | Doneker .............. | H01Q 17/005 |
| | | | 343/848 |
| 2016/0248483 A1 | 8/2016 | Ahmadi | |
| 2016/0330750 A1 | 11/2016 | Lee | |
| 2019/0305831 A1* | 10/2019 | Freisleben .......... | H04B 7/0413 |
| 2020/0112349 A1* | 4/2020 | Yang .................... | H04B 7/0404 |
| 2020/0267760 A1 | 8/2020 | Bhattad et al. | |
| 2021/0144029 A1* | 5/2021 | Wang .................... | H04L 5/0051 |
| 2023/0055394 A1* | 2/2023 | Elshafie .............. | H04B 7/0608 |
| 2023/0105787 A1* | 4/2023 | Chen .................... | H04B 7/0404 |
| | | | 370/329 |
| 2023/0275629 A1* | 8/2023 | Wang .................... | H04W 24/02 |
| | | | 375/262 |
| 2023/0318690 A1* | 10/2023 | Kurras .................... | H04B 7/06 |
| | | | 375/262 |
| 2023/0388080 A1* | 11/2023 | Hindy .................... | H04L 5/0057 |

(Continued)

*Primary Examiner* — Melanie Jagannathan
(74) *Attorney, Agent, or Firm* — Eschweiler & Potashnik, LLC; Matthew Glause

(57)　　　　ABSTRACT

The techniques provide solutions for a user equipment (UE) and base station to switch between T1R4 and 2T4R for sounding reference signals (SRS). The UE and base station may communicate SRS using 2T4R. The UE and/or base station may detect and evaluate a signal quality trigger and/or condition relating to switching from T2R4 to T1R4. The trigger and/or condition may correspond to a channel or radio frequency (RF) quality, conflicting or problematic band combinations used in a non-standalone (NSA) scenario, whether dedicated data subscription (DDS) subscriber identity module (SIM) or non-DDS SIM is being used in a dual SIM dual active (DSDA) scenario, etc. The UE and base station may either continue using T2R4 communications or switch to T1R4 communications based on the trigger and/or evaluation.

20 Claims, 16 Drawing Sheets

(56) References Cited

U.S. PATENT DOCUMENTS

| | | | |
|---|---|---|---|
| 2024/0214150 A1* | 6/2024 | Xiao | H04L 5/0048 |
| 2024/0372667 A1* | 11/2024 | Jacobsson | H04L 5/0051 |
| 2025/0192951 A1* | 6/2025 | Huang | H04L 5/0023 |
| 2025/0202550 A1* | 6/2025 | Gao | H04B 7/0413 |
| 2025/0294573 A1* | 9/2025 | Hosseini | H04W 72/231 |

* cited by examiner

500

| SRS CAPPED POWER | SINR (0 dB) | SINR (1 dB) | SINR (2 dB) | SINR (3 dB) | SINR AVG. (dB) | LAYER NUMBER | DL $T_{PUT}$ |
|---|---|---|---|---|---|---|---|
| NO CAP | 23 | 19 | 19 | 19 | 20 | 4 | 970 |
| 24 | 21 | 18 | 18 | 18 | 18.75 | 4 | 970 |
| 21 | 18 | 16 | 16 | 14 | 16 | 3 | 850 |
| 18 | 15 | 13 | 13 | 13 | 13.5 | 3 | 790 |
| 15 | 10 | 7 | 7 | 7 | 7.75 | 1-2 | 510 |
| 10 | 4 | 2 | 2 | 2 | 2.5 | 1 | 230 |

*FIG. 5*

BAND 3 (B3) AND BAND N41     BAND 3 (B3) ONLY (AFTER N41 IS NO LONGER USED)

PDSCH THROUGHPUT ($T_{PUT}$)

-------- PDSCH BLOCK ERROR RATE (BLER)

SYSTEMS, METHODS, AND DEVICES FOR DYNAMIC ADAPTION OF DIFFERENT ANTENNA CONFIGURATION COMMUNICATIONS

This Application claims the benefit of U.S. Provisional Application No. 63/409,151, filed on Sep. 22, 2022, the contents of which are hereby incorporated by reference in their entirety FIELD This disclosure relates to wireless communication networks and mobile device capabilities.

BACKGROUND

Wireless communication networks and wireless communication services are becoming increasingly dynamic, complex, and ubiquitous. For example, some wireless communication networks may be developed to implement fifth generation (5G) or new radio (NR) technology, sixth generation (6G) technology, and so on. Such technology may include solutions for enabling user equipment (UE) and network devices, such as base stations to communicate with one another using different resources and under different conditions.

BRIEF DESCRIPTION OF THE DRAWINGS

The present disclosure will be readily understood and enabled by the detailed description and accompanying figures of the drawings. Like reference numerals may designate like features and structural elements. Figures and corresponding descriptions are provided as non-limiting examples of aspects, implementations, etc., of the present disclosure, and references to "an" or "one" aspect, implementation, etc., may not necessarily refer to the same aspect, implementation, etc., and may mean at least one, one or more, etc.

FIGS. 5-6 are diagrams of example performance aspects relevant to 1T4R and 2T4R communications and channel or signal quality according to one or more implementations described herein.

DETAILED DESCRIPTION

Figure 1:
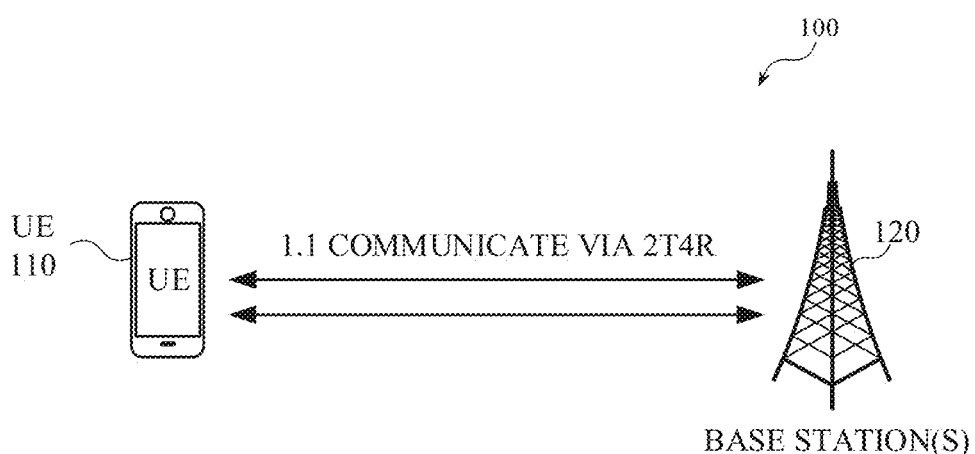
FIG. 1 is a diagram of an example overview according to one or more implementations described herein.
Figure 1:
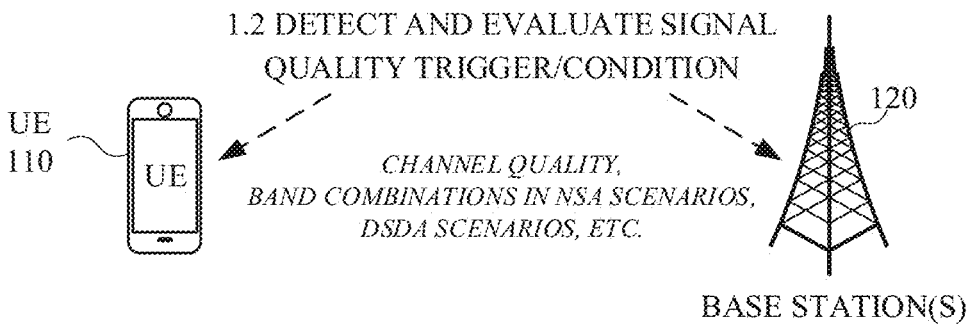
Figure 1:
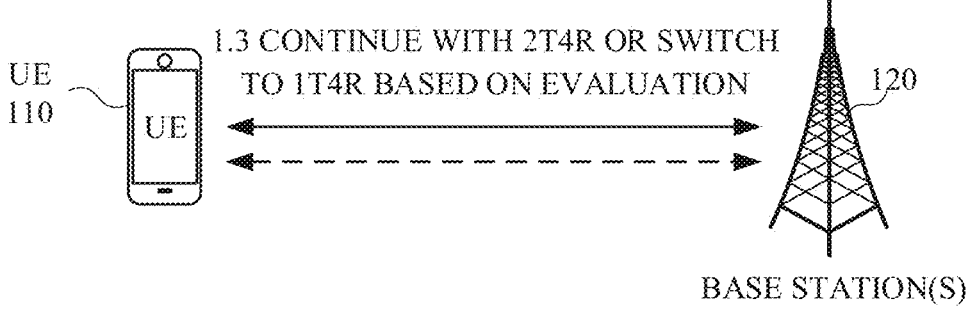

The following detailed description refers to the accompanying drawings. Like reference numbers in different drawings may identify the same or similar features, elements, operations, etc. Additionally, the present disclosure is not limited to the following description as other implementations may be utilized, and structural or logical changes made, without departing from the scope of the present disclosure.

Telecommunication networks may include user equipment (UEs) capable of communicating with base stations and/or other network access nodes. UEs and base stations may implement various techniques and communication standards for enabling UEs and base stations to discover one another, establish and maintain connectivity, and exchange information in an ongoing manner. Objectives of such techniques may include connection reliability, seamless connectivity between devices, multiple points of connection, quality of service and throughput rates, and more.

An aspect of enabling communications between UE and base station may include the use of sounding reference signals (SRS). An SRS, as described herein, may include a reference signal (RS) transmitted by a UE to enable a base station to determine a channel quality of an uplink (UL) path for a given region of a band or frequency. In short, regular and reliable SRSs from a UE may better enable a base station to allocate appropriate wireless resources, adjust communication parameters, and overall maintain a connection between UE and base station of a suitable quality and reliability. The base station is able to estimate the downlink propagation channel based on SRSs when channel reciprocity exists.

A base station may use radio resource configuration (RRC) to configure a UE to use certain SRS resources (e.g., SRS resource sets) for transmitting SRSs to the base station. An SRS resource may include a location of an SRS in a time domain and a frequency domain, at corresponding intervals, of a resource grid. Additionally, multiple SRSs may be interleaved or multiplexed using a frequency domain occupying the same orthogonal frequency-division multiplexing (OFDM) symbol. In some implementations, a base station, may also use SRSs in the downlink (DL) direction. Such signals between the UE and base station may be sent and received using a certain or specified number of transmitter (Tx) communication ports and receiver (Rx) communication ports. Additionally, or alternatively, a base station may configure a UE to transmit SRSs based on UE capability information provided to the base station by the UE.

UE capability information may include a wide range of information about the UE and an ability of the UE to, for example, send, receive, and process wireless signals. In some implementations, UE capability information may include an indication of the types of SRS communications that UE may perform and/or whether the UE is capable of SRS switching. UE capability information may include srs-TxSwitch and/or supportedSRS-TxPortSwitch parameters (as provided by 3rd generation partnership project (3GPP) communication standards) and may enumerate whether a UE is capable of T1R2, T1R4, T2R4, T11R4-T2R4, T1R1, T2R2, T4R4, etc., communication. Such parameters may indicate SRS ports, SRS resources, and UE antenna ports for SRS communications.

For example, "T1R2" may indicate that SRS communications may involve an SRS port 0 of a first SRS resource of UE antenna port 0, and an SRS port 0 of a second SRS resource of UE antenna port 1. Similarly, "T1R4" may indicate that SRS communications may involve an SRS port 0 of a first SRS resource of UE antenna port 0, an SRS port 0 of a second SRS resource of UE antenna port 1, an SRS port 0 of a third SRS resource of UE antenna port 2, and an SRS port 0 of a fourth SRS resource of UE antenna port 3. Additionally, "T2R4" may indicate that SRS communications may involve an SRS port 0 of a first SRS resource of UE antenna port 0, an SRS port 1 of the first SRS resource of UE antenna port 1, an SRS port 0 of a second SRS resource of UE antenna port 2, and an SRS port 1 of the second SRS resources of UE antenna port 3. UE capability information that includes T1R4-T2R4 may indicate, to the base station, that the UE is capable of, for example, T1R4, T2R4, and switching between T1R4 and T2R4 (also referred to as "antenna switching"). SRS ports are one set of antenna ports standardized by 3GPP. A UE can be configured to transmit the SRS from 1, 2 or 4 antenna ports. For example, 2 SRS ports are configured in a 2T4R. A UE antenna port, as described herein, may include a logical antenna port mapped to one or more physical antenna ports (e.g., via one-to-one or one-to-many mapping).

A base station may use RRC signaling to cause or prompt UE to engage in antenna switching. For example, base station may cause UE to switch from one type of SRS communication to another (e.g., from T1R4 communication to T2R4 communication). In some implementations, the base station may provide the UE with information and instructions for doing so via, for example, an SRS-ResourceSet.usage=antennaSwitching parameter of an RRC message. In some implementations, other types of signals and/or message may cause or prompt UE to engage in antenna switching. For example, a UE may indicate to a base station that the UE is capable of T1R4 SRS communications and T2R4 SRS communications by providing UE capability information indicating a T1R4-T2R4 parameter for srs-TxSwitching.

T2R4 may cause a UE to transmit SRSs using two SRS ports (e.g., SRS ports 0 and 1) of two SRS resources (e.g., SRS resources 0 and 1), where each SRS port and SRS resource combination uses a distinct of four UE antenna ports (e.g., UE antenna ports 0-3). Since each SRS resource involves two ports (e.g., SRS port 0 and 1), T2R4 may enable a base station to receive four SRSs while only using two SRS resources (e.g., SRS resources 0 and 1). By contrast, T1R4 may cause a UE to transmit SRSs using one port (e.g., SRS port 0) of four SRS resource (e.g., SRS resources 0-3), where each SRS port and SRS resource combination uses a distinct of four UE antenna ports (e.g., UE antenna ports 0-3). In practical terms, T2R4 may enable the UE to transmit four SRSs at a reduced transmission power (e.g., a reduced decibel (dB)) relative to T1R4; however, T1R4 may enable the UE to transmit four SRSs with greater strength or success since T1R4 may involve SRSs using one port of four SRS resources instead of only two SRS ports of two SRS resources used in T2R4. Nevertheless, currently available technologies fail to provide adequate solutions for switching between T1R4 and T2R4 for SRS transmissions.

Techniques described herein include solutions for dynamic adaptation of antenna configuration. As described herein, a first antenna configuration communication may include a 1 transmission and 4 reception antenna configuration (1T4R) communication and a second antenna configuration communication may include a 2 transmission and 4 reception antenna configuration (2T4R) communication. However, the techniques described herein may be applied to additional and/or different types of antenna configurations and antenna configuration communication.

FIG. 1 is a diagram of an example overview 100 according to one or more implementations described herein. As shown, example overview 100 may include processes and communications involving UE 110 and one or more base stations 120. For purposes of explaining overview 100, assume that UE 110 and base station 120 are capable of communicating using T1R4 and T2R4 communications, in addition to being capable of switching between T1R4 and T2R4 communications.

T1R4 and T2R4 communications may include the use of a different arrangement or variety of SRS ports, SRS resources, and UE antenna ports. For example, T1R4 communications may include, for example, SRS signaling that may include the use of SRS port 0 of a first SRS resource of UE antenna port 0, use of SRS port 0 of a second SRS resource of UE antenna port 1, use of SRS port 0 of a third SRS resource of UE antenna port 2, and use of SRS port 0 of a fourth SRS resource of UE antenna port 3. By contrast, T2R4 communications may include, for example, SRS signaling that may include the use of SRS port 0 of a first SRS resource of UE antenna port 0, an SRS port 1 of the first SRS resource of UE antenna port 1, an SRS port 0 of a second SRS resource of UE antenna port 2, and an SRS port 1 of the second SRS resources of UE antenna port 3.

As shown, UE 110 and base station 120 may communicate with one another using 2T4R communications (at 1.1). At some point, UE 110 and base station 120 may detect and evaluate a signal quality trigger and/or condition relating to switching from T2R4 communications to T1R4 communications (at 1.2). In some implementations, the trigger and/or condition may be detected by UE 110, base station 120, and/or both UE 110 and base station 120. The trigger and/or condition may correspond to a channel or radio frequency (RF) quality, conflicting or problematic band combinations used in a non-standalone (NSA) scenario, whether dedicated data subscription (DDS) subscriber identity module (SIM) or non-DDS SIM is being used in a dual SIM dual active (DSDA) scenario, etc.

Based on the signal or link quality trigger or condition, UE 110 and base station 120 may either continue using T2R4 communications or switch to T1R4 communications (at 1.3). Switching from T2R4 communications to T1R4 communications may, for example, improve the quality and reliability of SRS from UE 110 and in turn enhance an ability of base station 120 for channel estimation and ensure proper quality and DL performance. Additional features and techniques are described below with reference to the Figures below.

Generally, standalone (SA) scenario, as described herein, may include a network environment that supports 5th generation (5G) (e.g., new radio (NR)) communication standards of the 3rd generation partnership project (3GPP). For example, 5G-enabled UEs 110 may connect and communicate to base stations using frequency range 1 (FR1) and frequency range 2 (FR2). By contrast, an NSA scenario, as described herein, may include a network environment that supports 5th generation (5G) (e.g., new radio (NR)) communication standards of the 3rd generation partnership project (3GPP) using a 4th generation (4G) (e.g., long-term evolution (LTE)) network infrastructure. For example, 5G-enabled UEs may connect to 5G frequencies for data-throughput while using 4G for non-data duties such as communicating to base stations and/or servers.

Additionally, a UE 110 capable of dual SIM communication may include a UE 110 with two SIM cards, such that the UE 110 may handle two different network subscriptions. Each network subscription may be assigned to a different account or telephone number. For UEs 110 that include only one transceiver, only one of the two subscriptions may be transmitting or receiving radio RF signals at a time. Such devices may be referred to as dual SIM dual standby (DSDS) devices, since while one subscription is actively transmitting or receiving information, the other subscription may be put on standby. By contrast, in UEs 110 with two transceivers and two SIM cards, referred to as DSDA devices, both subscriptions may be actively transmitting or receiving simultaneously.

In some implementations, although DSDS devices may be configured with two different network subscriptions, only one of those subscriptions may support a data connection. Unlike voice services that may have a specific phone number associated with each subscription, having data services on one subscription is often sufficient to provide all the data services needed by the user independent of the other subscription. With this configuration, a DSDS device may have one network subscription for both data and voice services and the other subscription intended for only providing voice communications. Data services activated on only one subscription and the corresponding network subscription for such data services may be referred to herein as a DDS. Services that, for example, support voice calls only may be referred to as voice-only service or non-DDS services, and network subscriptions primarily providing voice communications are referred to herein as non-DDS.

Figure 2:
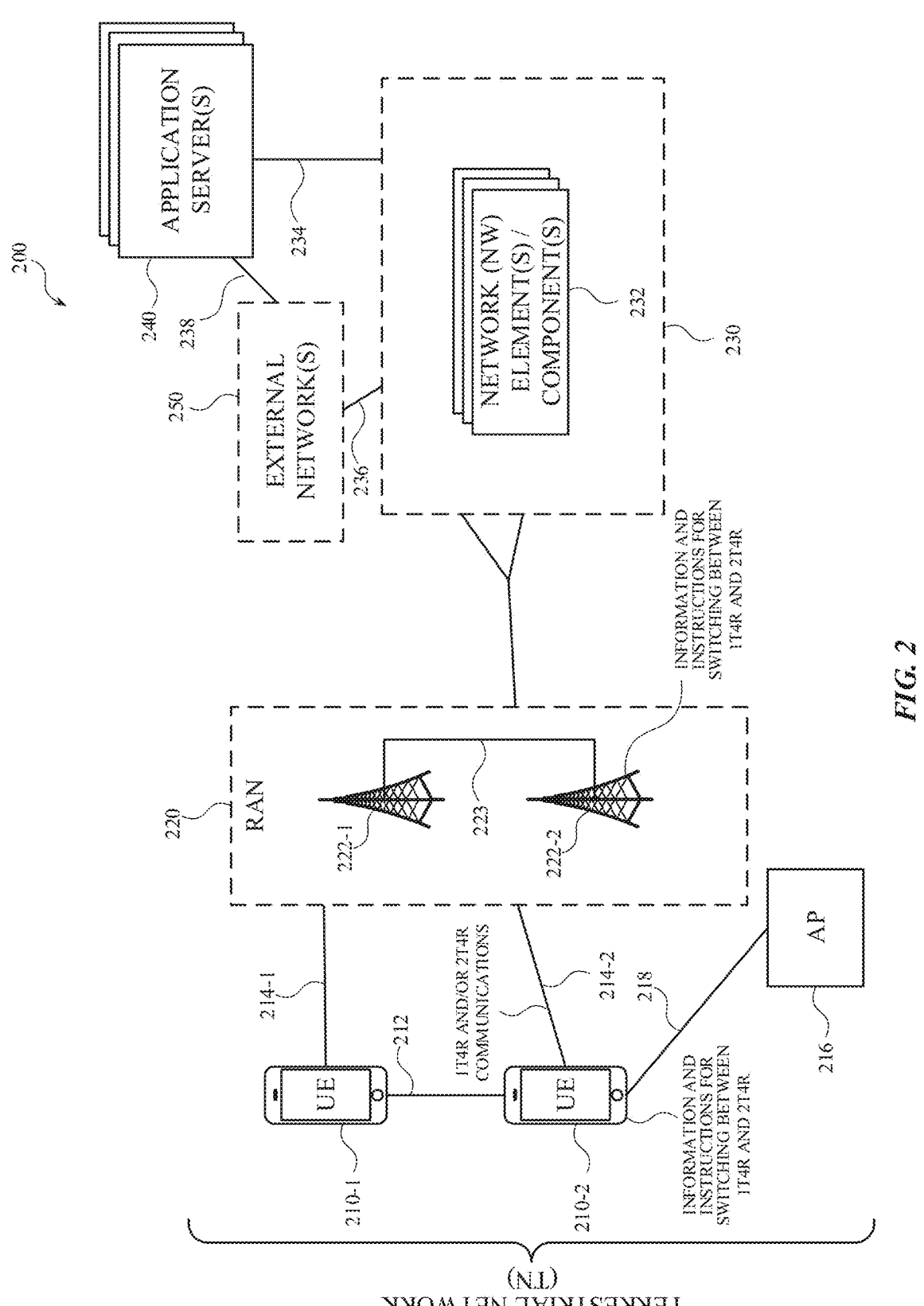
FIG. 2 is a diagram of an example network according to one or more implementations described herein.

FIG. 2 is an example network 200 according to one or more implementations described herein. Example network 200 may include UEs 210-1, 210-2, etc. (referred to collectively as "UEs 210" and individually as "UE 210"), a radio access network (RAN) 220, a core network (CN) 230, application servers 240, and external networks 250.

The systems and devices of example network 200 may operate in accordance with one or more communication standards, such as 2nd generation (2G), 3rd generation (3G), 4th generation (4G) (e.g., long-term evolution (LTE)), and/or 5th generation (5G) (e.g., new radio (NR)) communication standards of the 3rd generation partnership project (3GPP). Additionally, or alternatively, one or more of the systems and devices of example network 200 may operate in accordance with other communication standards and protocols discussed herein, including future versions or generations of 3GPP standards (e.g., sixth generation (6G) standards, seventh generation (7G) standards, etc.), institute of electrical and electronics engineers (IEEE) standards (e.g., wireless metropolitan area network (WMAN), worldwide interoperability for microwave access (WiMAX), etc.), and more.

As shown, UEs 210 may include smartphones (e.g., handheld touchscreen mobile computing devices connectable to one or more wireless communication networks). Additionally, or alternatively, UEs 210 may include other types of mobile or non-mobile computing devices capable of wireless communications, such as personal data assistants (PDAs), pagers, laptop computers, desktop computers, wireless handsets, etc. In some implementations, UEs 210 may include internet of things (IoT) devices (or IoT UEs) that may comprise a network access layer designed for low-power IoT applications utilizing short-lived UE connections. Additionally, or alternatively, an IoT UE may utilize one or more types of technologies, such as machine-to-machine (M2M) communications or machine-type communications (MTC) (e.g., to exchanging data with an MTC server or other device via a public land mobile network (PLMN)), proximity-based service (ProSe) or device-to-device (D2D) communications, sensor networks, IoT networks, and more. Depending on the scenario, an M2M or MTC exchange of data may be a machine-initiated exchange, and an IoT network may include interconnecting IoT UEs (which may include uniquely identifiable embedded computing devices within an Internet infrastructure) with short-lived connections. In some scenarios, IoT UEs may execute background applications (e.g., keep-alive messages, status updates, etc.) to facilitate the connections of the IoT network.

UEs 210 may communicate and establish a connection with one or more other UEs 210 via one or more wireless channels 212, each of which may comprise a physical communications interface/layer. The connection may include an M2M connection, MTC connection, D2D connection, SL connection, etc. The connection may involve a PC5 interface. In some implementations, UEs 210 may be configured to discover one another, negotiate wireless resources between one another, and establish connections between one another, without intervention or communications involving RAN node 222 or another type of network node. In some implementations, discovery, authentication, resource negotiation, registration, etc., may involve communications with RAN node 222 or another type of network node.

UEs 210 may use one or more wireless channels 212 to communicate with one another. As described herein, UE 210-1 may communicate with RAN node 222 to request SL resources. RAN node 222 may respond to the request by providing UE 210 with a dynamic grant (DG) or configured grant (CG) regarding SL resources. A DG may involve a grant based on a grant request from UE 210. A CG may involve a resource grant without a grant request and may be based on a type of service being provided (e.g., services that have strict timing or latency requirements). UE 210 may perform a clear channel assessment (CCA) procedure based on the DG or CG, select SL resources based on the CCA procedure and the DG or CG; and communicate with another UE 210 based on the SL resources. The UE 210 may communicate with RAN node 222 using a licensed frequency band and communicate with the other UE 210 using an unlicensed frequency band.

UEs 210 may communicate and establish a connection with (e.g., be communicatively coupled) with RAN 220, which may involve one or more wireless channels 214-1 and 214-2, each of which may comprise a physical communications interface/layer. In some implementations, a UE may be configured with dual connectivity (DC) as a multi-radio access technology (multi-RAT) or multi-radio dual connectivity (MR-DC), where a multiple receive and transmit (Rx/Tx) capable UE may use resources provided by different network nodes (e.g., 222-1 and 222-2) that may be connected via non-ideal backhaul (e.g., where one network node provides NR access and the other network node provides either E-UTRA for LTE or NR access for 5G). In such a scenario, one network node may operate as a master node (MN) and the other as the secondary node (SN). The MN and SN may be connected via a network interface, and at least the MN may be connected to the CN 230. Additionally, at least one of the MN or the SN may be operated with shared spectrum channel access, and functions specified for UE 210 can be used for an integrated access and backhaul mobile termination (IAB-MT). Similar for UE 210, the IAB-MT may access the network using either one network node or using two different nodes with enhanced dual connectivity (EN-DC) architectures, new radio dual connectivity (NR-DC) architectures, or the like. In some implementations, a base station (as described herein) may be an example of RAN node 222.

As described herein, UE 210 may receive and store one or more configurations, instructions, and/or other information for enabling SL-U communications with quality and priority standards. A PQI may be determined and used to indicate a QoS associated with an SL-U communication (e.g., a channel, data flow, etc.). Similarly, an L1 priority value may be determined and used to indicate a priority of an SL-U transmission, SL-U channel, SL-U data, etc. The PQI and/or L1 priority value may be mapped to a CAPC value, and the PQI, L1 priority, and/or CAPC may indicate SL channel occupancy time (COT) sharing, maximum (MCOT), timing gaps for COT sharing, LBT configuration, traffic and channel priorities, and more.

As shown, UE 210 may also, or alternatively, connect to access point (AP) 216 via connection interface 218, which may include an air interface enabling UE 210 to communicatively couple with AP 216. AP 216 may comprise a wireless local area network (WLAN), WLAN node, WLAN termination point, etc.

RAN 220 may include one or more RAN nodes 222-1 and 222-2 (referred to collectively as RAN nodes 222, and individually as RAN node 222) that enable channels 214-1 and 214-2 to be established between UEs 210 and RAN 220. RAN nodes 222 may include network access points configured to provide radio baseband functions for data and/or voice connectivity between users and the network based on one or more of the communication technologies described herein (e.g., 2G, 3G, 4G, 5G, WiFi, etc.). As examples therefore, a RAN node may be an E-UTRAN Node B (e.g., an enhanced Node B, eNodeB, eNB, 4G base station, etc.), a next generation base station (e.g., a 5G base station, NR base station, next generation NBs (gNB), etc.). RAN nodes 222 may include a roadside unit (RSU), a transmission reception point (TRxP or TRP), and one or more other types of ground stations (e.g., terrestrial access points). In some scenarios, RAN node 222 may be a dedicated physical device, such as a macrocell base station, and/or a low power (LP) base station for providing femtocells, picocells or the like having smaller coverage areas, smaller user capacity, or higher bandwidth compared to macrocells.

Some or all of RAN nodes 222, or portions thereof, may be implemented as one or more software entities running on server computers as part of a virtual network, which may be referred to as a centralized RAN (CRAN) and/or a virtual baseband unit pool (vBBUP). In these implementations, the CRAN or vBBUP may implement a RAN function split, such as a packet data convergence protocol (PDCP) split wherein radio resource control (RRC) and PDCP layers may be operated by the CRAN/vBBUP and other Layer 2 (L2) protocol entities may be operated by individual RAN nodes 222; a media access control (MAC)/physical (PHY) layer split wherein RRC, PDCP, radio link control (RLC), and MAC layers may be operated by the CRAN/vBBUP and the PHY layer may be operated by individual RAN nodes 222; or a "lower PHY" split wherein RRC, PDCP, RLC, MAC layers and upper portions of the PHY layer may be operated by the CRAN/vBBUP and lower portions of the PHY layer may be operated by individual RAN nodes 222. This virtualized framework may allow freed-up processor cores of RAN nodes 222 to perform or execute other virtualized applications.

In some implementations, an individual RAN node 222 may represent individual gNB-distributed units (DUs) connected to a gNB-control unit (CU) via individual F1 or other interfaces. In such implementations, the gNB-DUs may include one or more remote radio heads or radio frequency (RF) front end modules (RFEMs), and the gNB-CU may be operated by a server (not shown) located in RAN 220 or by a server pool (e.g., a group of servers configured to share resources) in a similar manner as the CRAN/vBBUP. Additionally, or alternatively, one or more of RAN nodes 222 may be next generation NodeBs (i.e., gNBs) that may provide evolved universal terrestrial radio access (E-UTRA) user plane and control plane protocol terminations toward UEs 210, and that may be connected to a 5G core network (5GC) 230 via an NG interface.

Any of the RAN nodes 222 may terminate an air interface protocol and may be the first point of contact for UEs 210. In some implementations, any of the RAN nodes 222 may fulfill various logical functions for the RAN 220 including, but not limited to, radio network controller (RNC) functions such as radio bearer management, uplink and downlink dynamic radio resource management and data packet scheduling, and mobility management. UEs 210 may be configured to communicate using orthogonal frequency-division multiplexing (OFDM) communication signals with each other or with any of the RAN nodes 222 over a multicarrier communication channel in accordance with various communication techniques, such as, but not limited to, an OFDMA communication technique (e.g., for downlink communications) or a single carrier frequency-division multiple access (SC-FDMA) communication technique (e.g., for uplink and ProSe or sidelink (SL) communications), although the scope of such implementations may not be limited in this regard. The OFDM signals may comprise a plurality of orthogonal subcarriers.

In upon carrier aggregation (CA) technology, each aggregated carrier is referred to as a component carrier (CC). In some cases, individual CCs may have a different bandwidth than other CCs. In time division duplex (TDD) systems, the number of CCs as well as the bandwidths of each CC may be the same for DL and UL. CA also comprises individual serving cells to provide individual CCs. The coverage of the serving cells may differ, for example, because CCs on different frequency bands will experience different pathloss. A primary service cell or PCell may provide a primary component carrier (PCC) for both UL and DL and may handle RRC and non-access stratum (NAS) related activities. The other serving cells are referred to as SCells, and each SCell may provide an individual secondary component carrier (SCC) for both UL and DL.

The SCCs may be added and removed as required, while changing the PCC may require UE 210 to undergo a handover. In licensed assisted access (LAA), eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different physical uplink shared channel (PUSCH) starting positions within a same subframe. To operate in the unlicensed spectrum, UEs 210 and the RAN nodes 222 may also operate using stand-alone unlicensed operation where the UE may be configured with a PCell, in addition to any SCells, in unlicensed spectrum.

As described herein, UE 210 and base station 222 may communicate with one another using 2T4R communications. UE 110 and/or base station 222 may detect and evaluate a signal quality trigger and/or condition relating to switching from T2R4 communications to T1R4 communications. The trigger and/or condition may correspond to a channel or radio frequency (RF) quality, conflicting or problematic band combinations being used in an NSA scenario, whether DDS SIM or non-DDS SIM is being used in a DSDA scenario, etc. Based on the evaluation, UE 210 and base station 222 may continue using T2R4 communications or switch to T1R4 communications. Switching from T2R4 communications to T1R4 communications may, for example, improve the quality and reliability of SRS from UE 210 and in turn enhance an ability of base station 222 for channel estimation and ensure proper quality and DL performance. UE 210 and base station 222 may send, receive, and/or store information and instructions for performing these and other operations, relating to switching between 1T4R and 2T4R communications.

Some implementations may use concepts for resource allocation for control channel information that are an extension of the above-described concepts. For example, some implementations may utilize an extended (E)-PDCCH that uses PDSCH resources for control information transmission. The EPDCCH may be transmitted using one or more ECCEs. Similar to the above, each ECCE may correspond to nine sets of four physical resource elements known as an EREGs. An ECCE may have other numbers of EREGs in some situations.

The RAN nodes 222 may be configured to communicate with one another via interface 223. In implementations where the system is an LTE system, interface 223 may be an X2 interface. In NR systems, interface 223 may be an Xn interface. The X2 interface may be defined between two or more RAN nodes 222 (e.g., two or more eNBs/gNBs or a combination thereof) that connect to evolved packet core (EPC) or CN 230, or between two eNBs connecting to an EPC.

As shown, RAN 220 may be connected (e.g., communicatively coupled) to CN 230. CN 230 may comprise a plurality of network elements 232, which are configured to offer various data and telecommunications services to customers/subscribers (e.g., users of UEs 210) who are connected to the CN 230 via the RAN 220. In some implementations, CN 230 may include an evolved packet core (EPC), a 5G CN, and/or one or more additional or alternative types of CNs. The components of the CN 230 may be implemented in one physical node or separate physical nodes including components to read and execute instructions from a machine-readable or computer-readable medium (e.g., a non-transitory machine-readable storage medium). In some implementations, network function virtualization (NFV) may be utilized to virtualize any or all the above-described network node roles or functions via executable instructions stored in one or more computer-readable storage mediums (described in further detail below). A logical instantiation of the CN 230 may be referred to as a network slice, and a logical instantiation of a portion of the CN 230 may be referred to as a network sub-slice. Network Function Virtualization (NFV) architectures and infrastructures may be used to virtualize one or more network functions, alternatively performed by proprietary hardware, onto physical resources comprising a combination of industry-standard server hardware, storage hardware, or switches. In other words, NFV systems may be used to execute virtual or reconfigurable implementations of one or more EPC components/functions.

As shown, CN 230, application servers 240, and external networks 250 may be connected to one another via interfaces 234, 236, and 238, which may include IP network interfaces. Application servers 240 may include one or more server devices or network elements (e.g., virtual network functions (VNFs) offering applications that use IP bearer resources with CN 230 (e.g., universal mobile telecommunications system packet services (UMTS PS) domain, LTE PS data services, etc.). Application servers 240 may also, or alternatively, be configured to support one or more communication services (e.g., voice over IP (VoIP sessions, push-to-talk (PTT) sessions, group communication sessions, social networking services, etc.) for UEs 210 via the CN 230. Similarly, external networks 250 may include one or more of a variety of networks, including the Internet, thereby providing the mobile communication network and UEs 210 of the network access to a variety of additional services, information, interconnectivity, and other network features.

Figure 3:
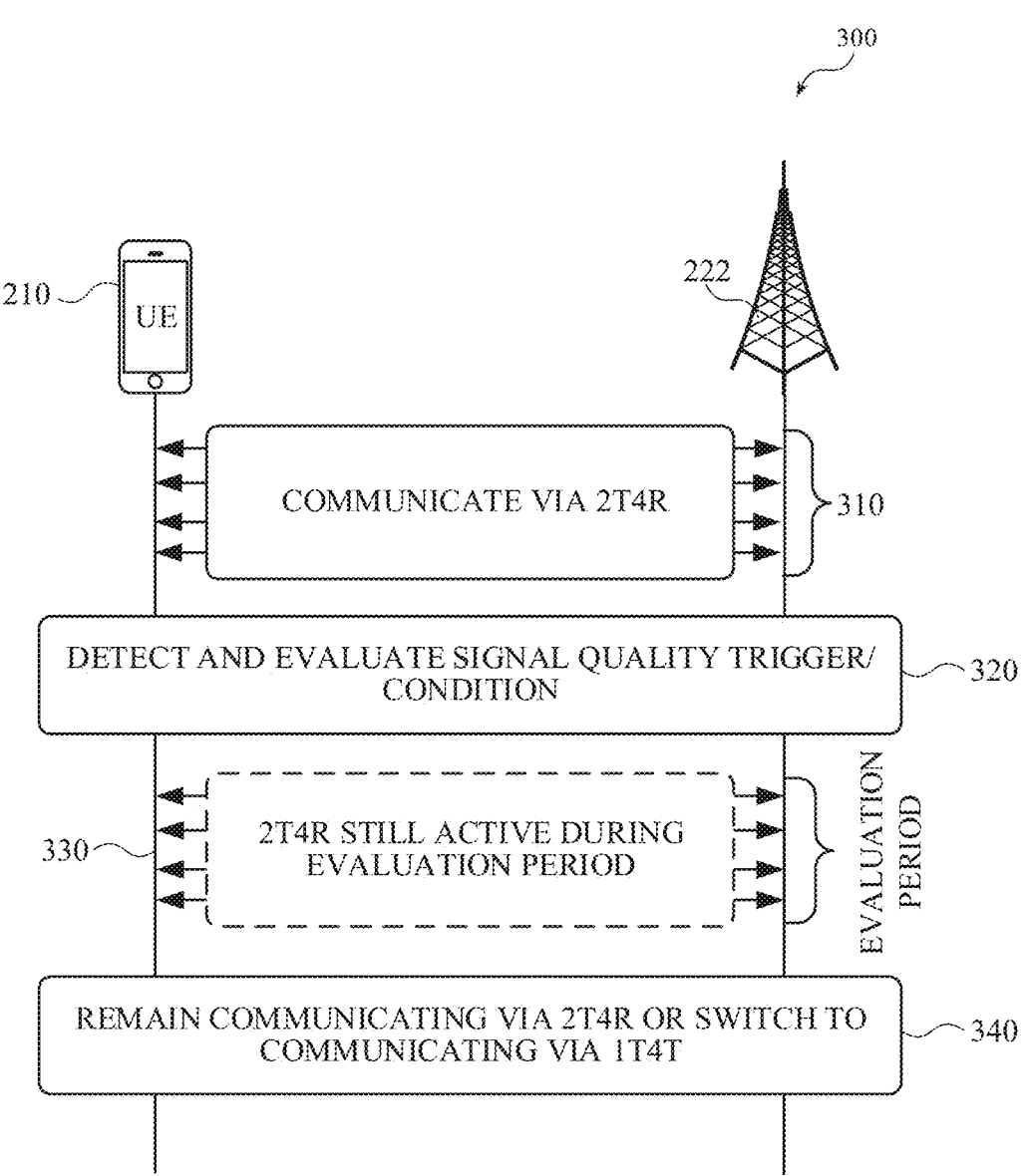
FIG. 3 is a diagram of an example process for dynamic adaptation of 1 transmission and 4 reception antenna configuration (1T4R) communications and 2 transmission and 4 reception antenna configuration (2T4R) communications according to one or more implementations described herein.

FIG. 3 is a diagram of an example process 300 for dynamic adaptation of 1T4R and 2T4R communications according to one or more implementations described herein. Process 300 may be implemented by UE 210 and one or more base stations 222. In some implementations, some or all of process 300 may be performed by one or more other systems or devices, including one or more of the devices of FIG. 2. Additionally, process 300 may include one or more fewer, additional, differently ordered and/or arranged operations than those shown in FIG. 3. In some implementations, some or all of the operations of process 300 may be performed independently, successively, simultaneously, etc., of one or more of the other operations of process 300. As such, the techniques described herein are not limited to a number, sequence, arrangement, timing, etc., of the operations or process depicted in FIG. 3.

As shown, process 300 may include UE 210 and base station 222 communicating via 2T4R (at 310). For example, UE 210 and base station 222 may each be capable of communicating via 1T4R and 2T4R, in addition to being capable of switching between 1T4R and 2T4R communications. 1T4R and 2T4R may include different types of antenna switching configurations. Antenna switching, as described herein, may include switching which UE antenna port(s) are used for SRS transmissions. Additionally, or alternatively, switching between 1T4R and 2T4R may include dynamically configuring or otherwise causing a UE to change from between 1T4R and 2T4R configurations. UE 210 may provide base station 222 with UE capability information that may include indicate that UE 210 is capable of, for example, T1R4, T2R4, and switching between T1R4 and T2R4 (e.g., T1R4-T2R4) also referred to as antenna switching. For purposes of explaining FIG. 3, assume that base station 222 provides control information (e.g., RRC, downlink control information (DCI), etc.) to UE 210 to cause UE 210 to communicate SRS to base station 222 using T2R4.

As such, UE 310 may provide SRS to base station 222 using two SRS ports (e.g., SRS port 0 and 1) of two SRS resources (e.g., SRS resource 0 and 1), where each SRS port and SRS resource combination each uses one of a distinct of four UE antenna ports (e.g., UE antenna ports 0-3). Since each SRS resource involves two ports (e.g., SRS port 0 and 1), T2R4 may enable a base station to receive four SRSs while only using two SRS resources (e.g., SRS resources 0 and 1). Base station 222 may use the SRS information from UE 210 to determine DL channel and signal qualities, allocate or reallocate appropriate radio signals for communicating with UE 210, configure and/or reconfigure UE 210 based on the SRS information, etc.

At some point 320, UE 210 and/or base station 222 may detect and evaluate a signal quality trigger and/or condition In some implementations, the trigger and/or condition may be detected by UE 110, base station 120, and/or both UE 110 and base station 120. The trigger and/or detected condition may include one or more of: 1) a problematic channel or RF quality and/or a problematic SRS Tx power extends during an evaluation period; 2) a use of conflicting or problematic band combinations used in an NSA scenario during an evaluation period; or 3) whether a current DSDA combo is impacted when DDS SIM is active with one Tx being occupied and whether UE 210 continues to report "RANK=4" but skips one SRS Tx port (e.g., one SRS Tx port is without power).

As shown at block 340, UE 210 and base station 222 may continue communicating via 2T4R during an evaluation period of the signal quality trigger and/or condition (block 330). Additionally, or alternatively, based on an outcome of the evaluation period, UE 210 and base station 222 may either remain communicating via 2T4R or transition to communicating via 1T4R. For example, when there is no meaningful signal quality or transmission power problems, no problematic combination bands are being used in an NSA scenario, or the current DSDA combo is not being adversely impacted when the DDS SIM is active, UE 210 and base station 222 may continue communicating via 2T4R. Alternatively, when there is meaningful signal quality or transmission power problems, problematic combination bands are being used in an NSA scenario, or the current DSDA combo is being adversely impacted when the DDS SIM is active, UE 210 and base station 222 may switch from communicating via 2T4R to communicating 1T4R. In some implementations, UE 210 may proactively or unilaterally switch from 2T4R to 1T4R, while in other implementations, UE 210 may switch to 1T4R in response to a command or other instructions from base station 222. The Figures below provide examples of more particular implementations and aspects, features, and/or benefits of implementing one or more of the techniques described herein.

Figure 4:
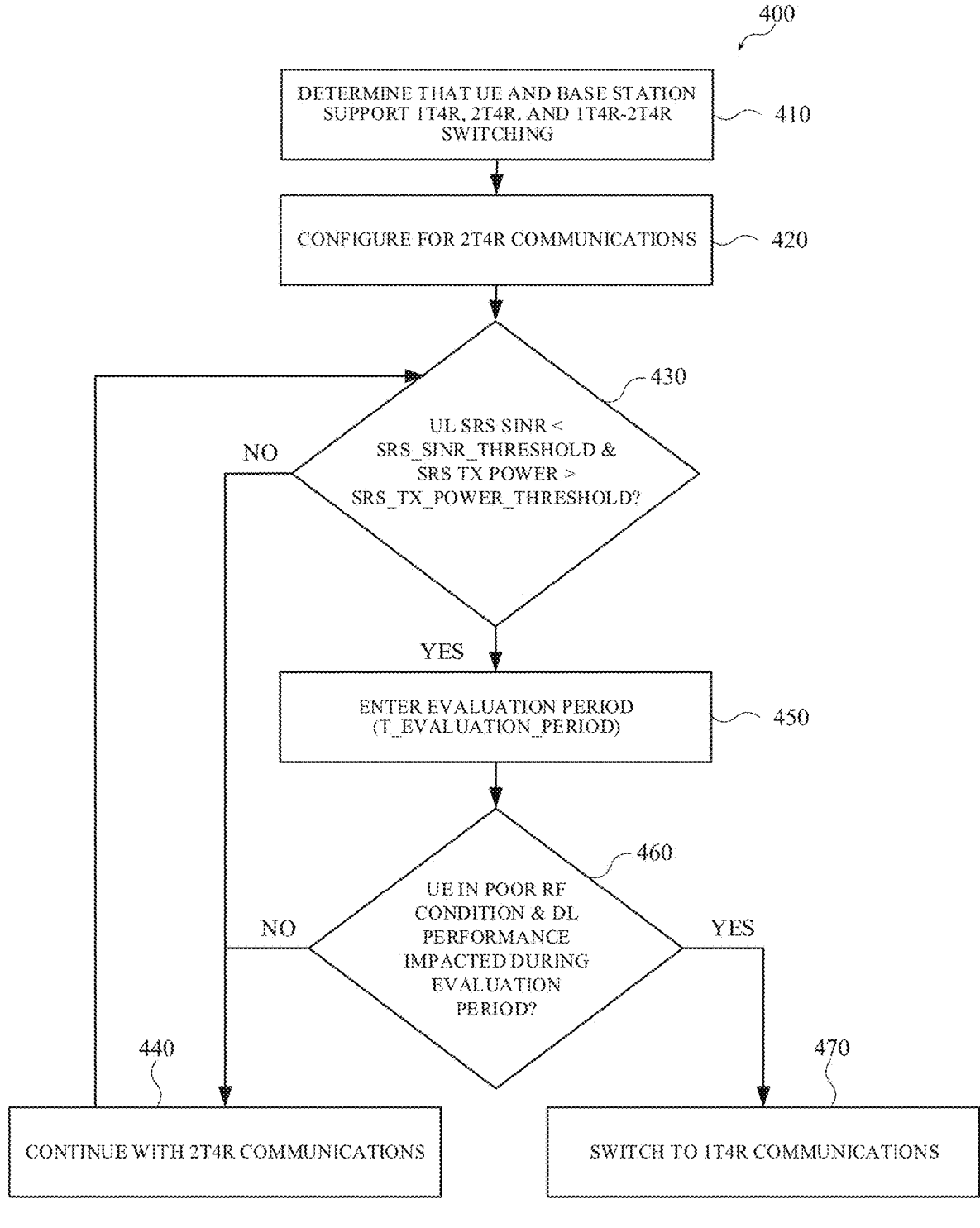
FIG. 4 is a diagram of an example process for dynamic adaptation of 1T4R and 2T4R communications based on a channel or signal quality according to one or more implementations described herein.

FIG. 4 is a diagram of an example process 400 for dynamic adaptation of 1T4R and 2T4R communications based on a channel or signal quality according to one or more implementations described herein. Process 400 may be implemented by base station 222. In some implementations, some or all of process 400 may be performed by one or more other systems or devices, including one or more of the devices of FIG. 2. Additionally, process 400 may include one or more fewer, additional, differently ordered and/or arranged operations than those shown in FIG. 4. In some implementations, some or all of the operations of process 400 may be performed independently, successively, simultaneously, etc., of one or more of the other operations of process 400. As such, the techniques described herein are not limited to a number, sequence, arrangement, timing, etc., of the operations or process depicted in FIG. 4.

As shown, process 400 may include base station 222 determining that UE 210 and base station 222 are capable of communicating via 1T4R and 2T4R, in addition to being capable of switching between 1T4R and 2T4R communications (block 410). UE 210 may provide base station 222 with UE capability information that may include indicate that UE 210 is capable of, for example, T1R4, T2R4, and switching between T1R4 and T2R4 (e.g., T1R4-T2R4) also referred to as antenna switching. Base station 222 may including locally stored information indicating whether base station is capable of T1R4, T2R4, and switching between T1R4 and T2R4 (e.g., T11R4-T2R4). Additionally, base station 222 may provide UE 210 control information (e.g., RRC, DCI, etc.) to cause UE 210 to communicate SRSs to base station 222 using T2R4. As such, process 400 may include UE 210 configuring itself (e.g., via information from base station 222) for T2R4 communications (block 420).

Process 400 may also include base station 222 monitoring and evaluating SRSs from UE 210 (block 430). For example, when base station 222 determines that either a UL SRS signal to interference and noise ratio (SINR) is not below an SRS SINR threshold and/or an SRS Tx power is not greater than an SRS Tx power threshold (block 430—NO), process 400 may proceed with continuing 2T4R communications between UE 210 and base station 222 (block 440) and monitoring and evaluating SRSs from UE 210 (block 430).

By contrast, when base station 222 determines that either a UL SRS SINR is below an SRS SINR threshold and/or an SRS Tx power is not greater than an SRS Tx power threshold (block 430—YES), process 300 may proceed with base station 222 entering an evaluation period (represented by T_evaluation_period) (block 450). An evaluation period may include a pre-selected amount of time (e.g., one or more slots) for base station 222 to evaluate signal and/or channel conditions between UE 210 and base station 222. In some implementations, the evaluation period may end upon expiration of the evaluation period. In some implementations, the evaluation period may also, or alternatively, end based on one or more triggers or conditions, such as the completion of a number of measurement or evaluation operations, a change in communication circumstances (e.g., resources) between UE 210 and base station 222, a handover procedure, etc.

Process 400 may proceed with determining whether UE 210 is in a poor RF condition and whether DL performance is impacted during the evaluation period (block 460). For example, base station 222 may measurement, monitor, and or evaluate one or more inputs, signals, and/or performance metrics relating to UE 210 and UL signals from UE 210. Examples of such metrics may include a PUSCH quality, a block error rate (BLER), an SRS, an SINR, a pathloss, and/or one or more other UL signals or characteristics, measurements, ratios, and/or combinations thereof. One or more thresholds for one or more performance metrics or measurements may be used (e.g., a pathloss relative to a pathloss threshold, a PUSCH BLER relative to a PUSCH BLER threshold, and so on).

Based on an analysis of one or more of these or other characteristics or performance metrics, base station 222 may determine (during the evaluation period) whether UE 210 is in a poor RF condition (block 460). Base station 222 may also, or alternatively, determine whether DL performance is being impacted by the RF condition of UE 210. When UE 210 is not in a poor RF condition (block 460—NO), process 400 may proceed with continuing 2T4R communications between UE 210 and base station 222 (block 440) and monitoring and evaluating SRSs from UE 210 (block 430). When UE 210 is in a poor RF condition (block 460—YES), process 400 may proceed with switching to 1T4R communications (block 470). For example, base station 222 may provide UE 210 with control signaling (e.g., an RRC message, DCI, etc.) to cause UE 210 to switch to communicating SRSs via 1T4R communications. Doing so may, for example, improve a quality of the SRS by causing UE 210 to increase a transmission power of the SRS (e.g., by 3 dB). In turn, this may better enable base station 222 to perform channel estimation and calibrate for DL signaling especially when UE 210 is located between a middle distance and a far distance from base station 222.

Figure 6:
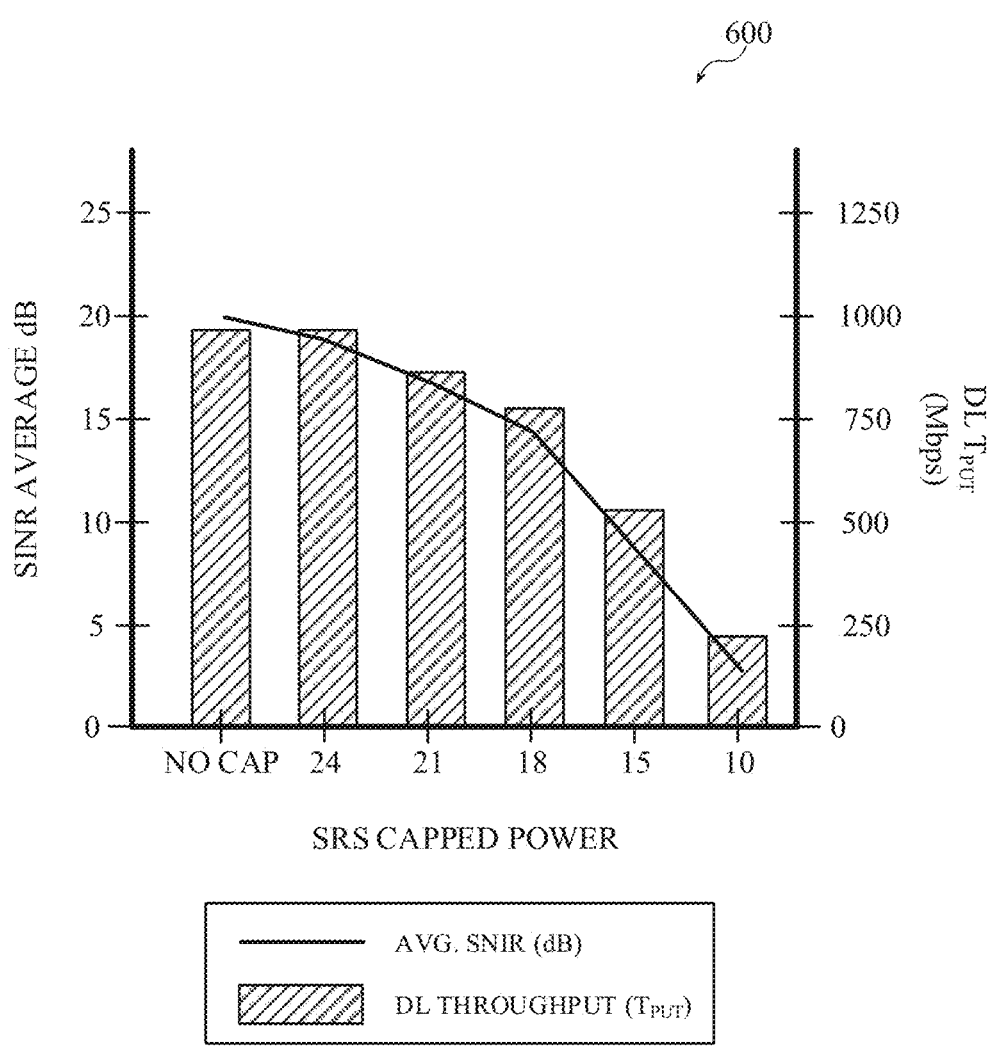

FIGS. 5-6 are diagrams of example performance aspects 500 and 600 relevant to 1T4R and 2T4R communications and channel or signal quality according to one or more implementations described herein. Example 500 in includes a table charting SRS capped power levels (e.g., NO CAP, 24 decibels (dB), 21 dB, 18 dB, etc.) to corresponding values for SINR 0 dB, SINR 1 dB, SINR 2 dB, SINR 3 dB, SINR average dB, Layer Number, and DL Throughput ($T_{put}$). The values of example 500 may represent performance findings in a test using a Conducted Mode with no fading and having a far point RSRP of approximately 105 dBm, and an SRS Tx at a maximum transmit power level (MTPL). The SRS being checked or measured from the network side and network schedule DL was based on SRS quality alone. Mapping the values of example to 500 to example table 600 of FIG. 6 indicates changes in an SINR average dB and DL $T_{put}$ relative to changes in an SRS capped power. In other words, examples 500 and 600 show that SRS Tx power may impact DL performance, especially when UE 210 is located a moderate or long distance from base station 222, and a 3 dB decrease in SRS Tx power may introduce around −30% degradation in DL throughput performance.

Figure 7:
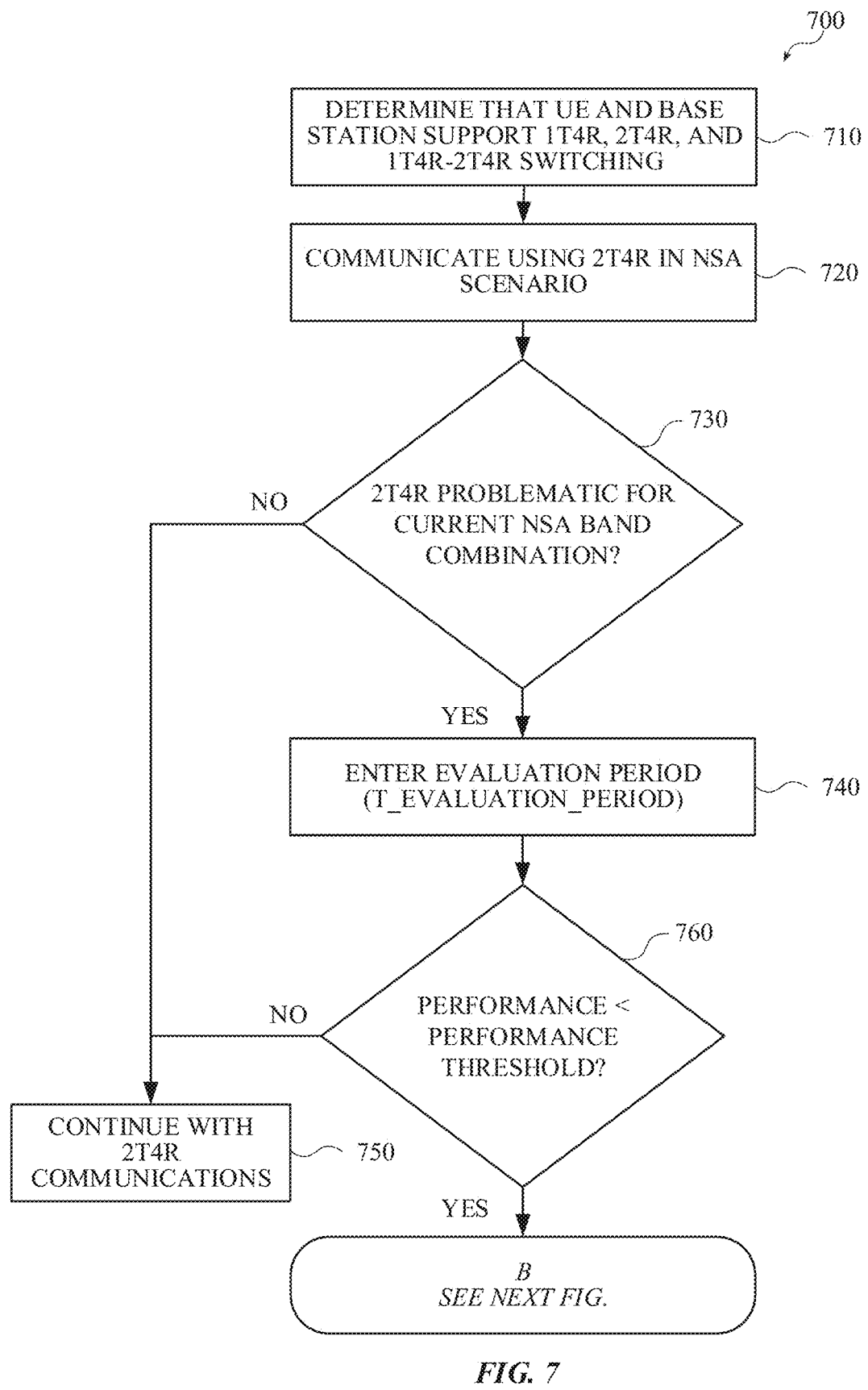
FIGS. 7-8 are diagrams of an example process for dynamic adaptation of 1T4R and 2T4R communications in a non-standalone (NSA) environment according to one or more implementations described herein.
Figure 8:
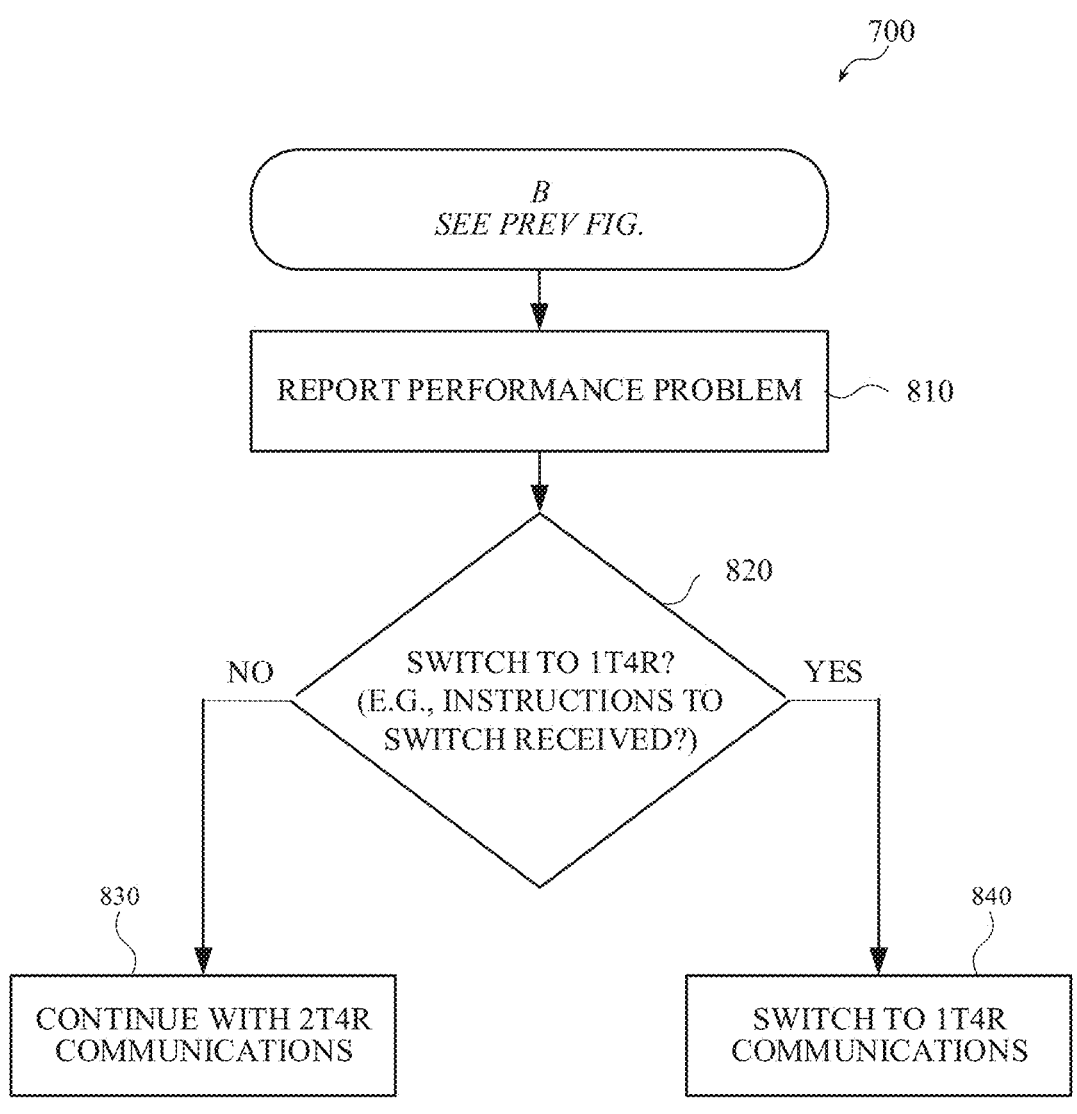

FIGS. 7-8 are diagrams of an example process 700 for dynamic adaptation of 1T4R and 2T4R communications in an NSA environment according to one or more implementations described herein. Process 700 may be implemented by UE 210. In some implementations, some or all of process 700 may be performed by one or more other systems or devices, including one or more of the devices of FIG. 2. Additionally, process 700 may include one or more fewer, additional, differently ordered and/or arranged operations than those shown in FIGS. 7-8. In some implementations, some or all of the operations of process 700 may be performed independently, successively, simultaneously, etc., of one or more of the other operations of process 700. As such, the techniques described herein are not limited to a number, sequence, arrangement, timing, etc., of the operations or process depicted in FIGS. 7-8. Additionally, FIGS. 9-11, described below, may be interpreted as providing a foundation for better understanding an example implementation environment, benefits, and/or implications of process 700.

Figure 9:
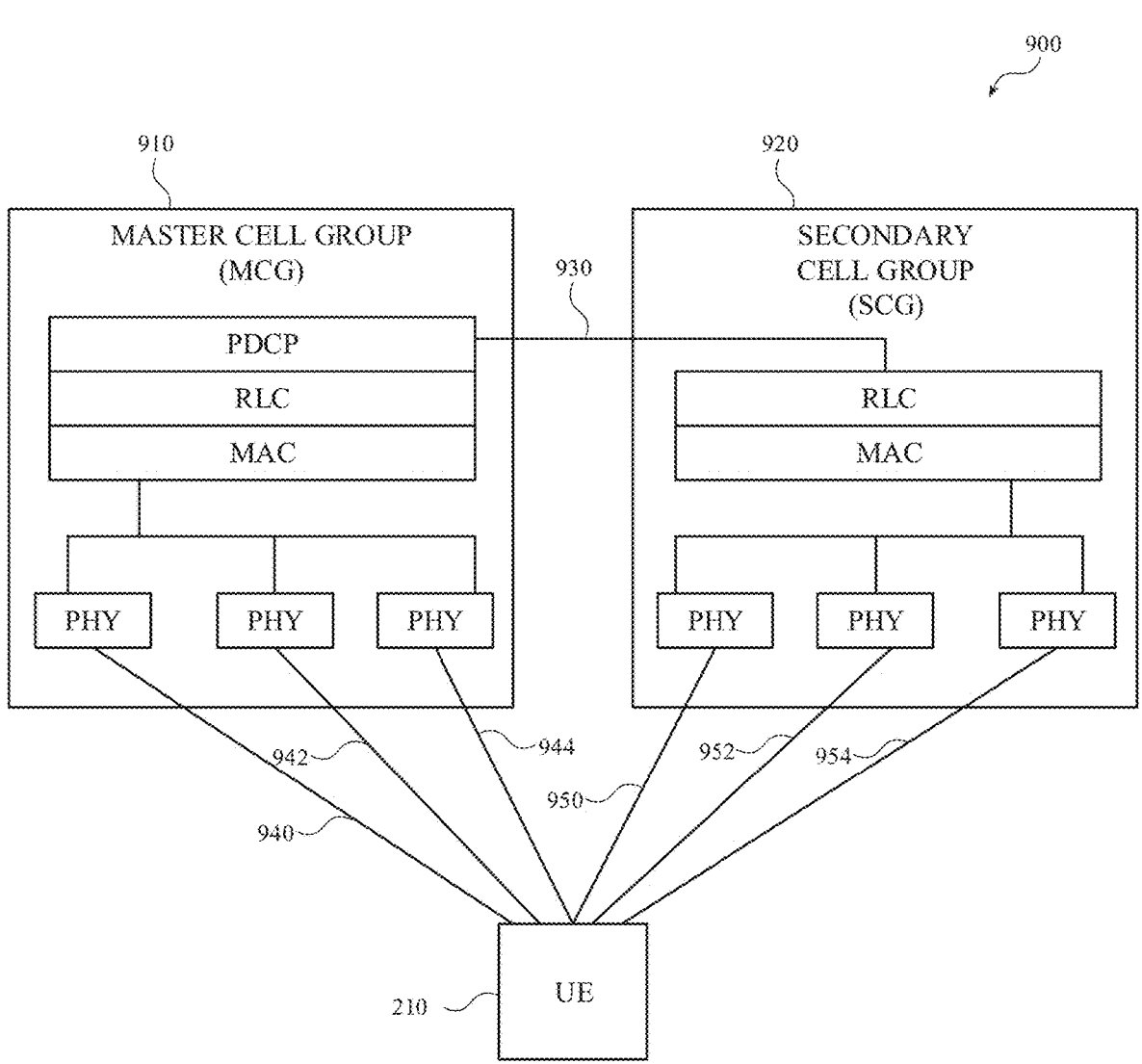
FIG. 9 is a diagram of an example of a master cell group (MCG) and a secondary cell group (SCG) of a wireless communication network according to one or more implementations described herein.

FIG. 9 is a diagram of an example 900 of a master cell group (MCG) 910 and a secondary cell group (SCG) 920 of a wireless communication network. An MCG may include a group of cells associated with a master node, comprising a primary cell (PCell) and one or more secondary cells (SCells). An SCG may include a group of serving cells associated with a secondary node, comprising a primary cell of the secondary cell group (PSCell) and optionally one or more SCells.

MCG 910 may be implemented by one or more base stations and may include one or more layers. Examples of such layers may include a packet data convergence protocol (PDCP) layer, a radio link control (RLC) layer, a media access control (MAC) layer, and multiple physical (PHY) layers. Each PHY layer may correspond to a different implementation of a cell with respect to UE 210. Additionally, or alternatively, the PHY layers may operate in combination (e.g., be managed, controlled by, etc.) the PDCP, RLC, and MAC layers. In some implementations, one PHY layer 940 may operate as a primary cell (PCell) or a special cell (SpCell) and other PHY layers 942 and 944 may operate to secondary cells (SCells) to the PCell.

SCG 920 may include multiple layers as well, including an RLC layer, a MAC layer, and multiple PHY layers 950, 952, and 954. SCG 920 may not include a PDCP layer, but instead may rely on the PDCP layer of MCG 910 via connection 930. Similar to the PHY layers of MCG 910, the PHY layers of SCG 920 may each function or operate as a cell with respect to UE 210. In some implementations, one PHY layer 950 may operate as a primary cell (PCell) to PHY layers 952 and 954, which may operate as secondary cells to the PCell of PHY layer 950. Additionally, MCG 910 and SCG 920 may each include a PCell (e.g., 940 and 950), and a PCell may be referred to herein as a special cell or special primary cell, represented as SpCell. Further, a secondary cell (SCell) of either MCG 910 or SCG 920 may operate as a scheduling secondary cell (sSCell) configured to provide configuration, scheduling, activation, deactivation, and other functions or commands toward a SpCell of either MCG 910 or SCG 920.

MCG 910 and SCG 920 may be involved in a dual connectivity scenario with UE 210, in which case a random access channel (RACH) procedure, and the like, may be directed to MCG 910. MCG 910 and SCG 920 may also implement an SA and/or NSA network environment for UE 210. In a SA network environment, MCG 910 and SCG 920 may communicate with UE 210 using 5G NR communication standards. In a NSA network environment, MCG 910 and SCG 920 may communicate with UE 210 using a combination of 4G LTE and 5G NR communication standards. For example, NSA connectivity may involve a B3 band of the 4G LTE 3GPP communications standards and an n41 band of the 5G NR 3GPP communications standards. DL performance of the 4G LTE band may be adversely affected by SRS Tx sent from UE 210 to a SCG via the 5G NR band, especially when UE 210 is using 2T4R to send SRSs.

Figure 10:
FIGS. 10-11 are diagrams of examples that represent a NSA band combination that adversely affects downlink (DL) performance according to one or more implementations described herein.
Figure 11:
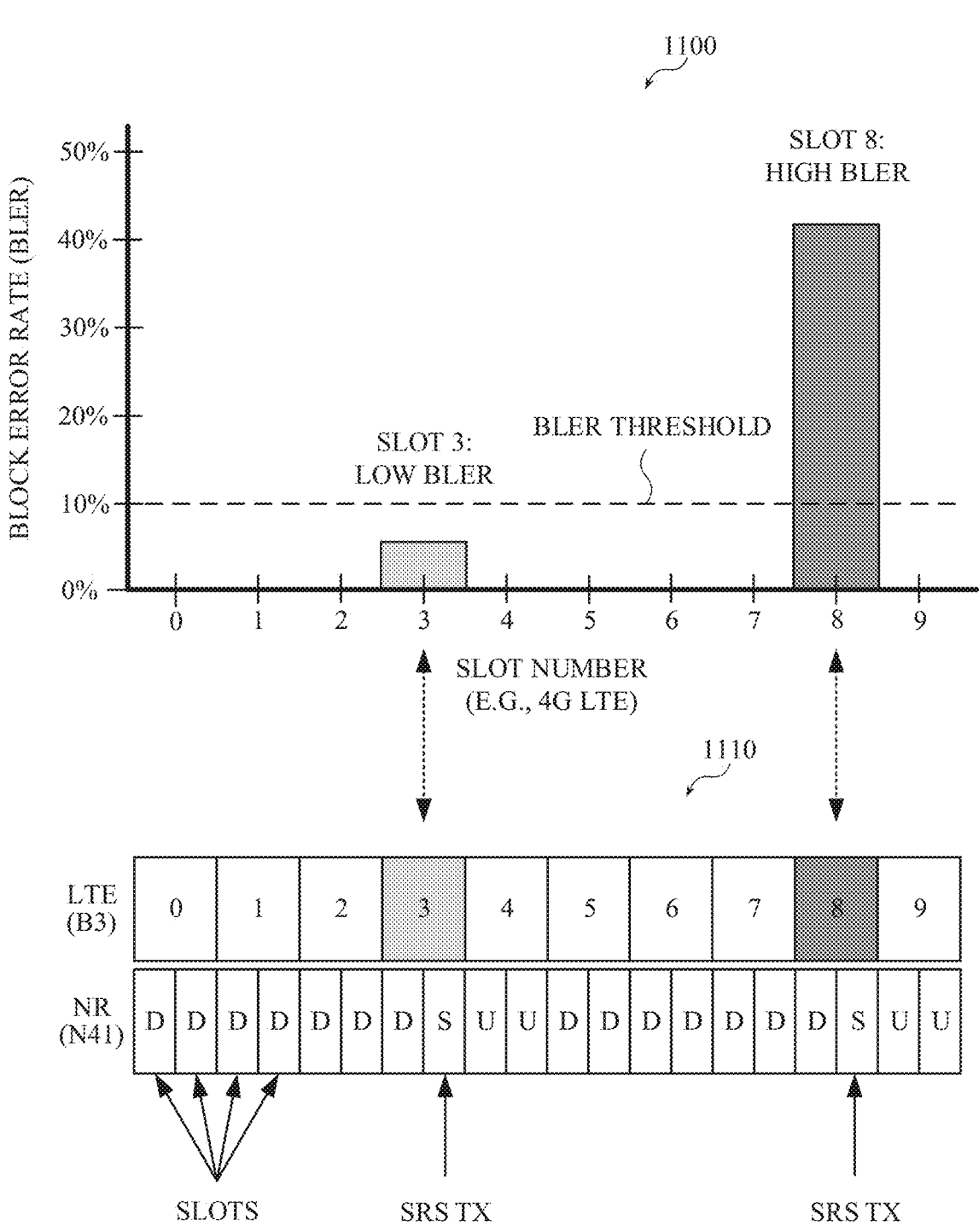

FIGS. 10-11 are diagrams of examples that represent a NSA band combination that adversely affects DL performance according to one or more implementations described herein. The adverse performance impact of a problematic NSA band combination, as illustrated in FIGS. 10-11, may be even greater when 2T4R communications are used instead of 1T4R communications, thus highlighting one or more of the benefits of process 700 of FIGS. 7-8. In other words, performance deficiencies with certain NSA band combinations (e.g., a B3 and n41 band combination) are represented by FIGS. 10-11 and may be exacerbated when, for example, 2T4R communications are used instead of 1T4R communications for SRS Tx.

FIG. 10 is a diagram of an example table 1000 representing changes in a PDSCH throughput and a PDSCH BLER when B3 and n41 are used in combination relative to when B3 is used alone. For reference, time is charted along a horizontal axis while each of a DL scheduled throughput and a DL BLER are provided along opposing vertical axes. As shown, a PDSCH BLER may be elevated when B3 and n41 are used in combination relative to when B3 is used alone. Conversely, a PDSCH throughput may be decreased when B3 and n41 are used in combination relative to when B3 is used alone.

FIG. 11 is a diagram of an example table 1100 representing an example of 4G LTE DL performance of a corresponding to a NAS slot arrangement 1110. Example table 1100 represents a BLER for an LTE Rx antenna along a vertical axis and slots 0-9 along a horizontal axis. NAS slot arrangement 1110 includes a row of 4G LTE slots and corresponding row of 5G NR slots. The 5G NR slots may include DL slots (D), SRS transmission slots (S), and UL slots (U). The 4G LTE slots 0-9 of NAS slot arrangement 1110 may correspond to slots 0-9 represented along the horizontal axis of example table 1100. Slots 0-9 of example table 1100 and NAS slot arrangement 1110 may correspond to a B3 band, and 5G NR slots of NAS slot arrangement 1110 may correspond to a 5G NR an n41 band.

As shown, example table 1100 includes a BLER below a BLER threshold for slot 3 and a BLER above the BLER threshold for slot 8. One NR SRS Tx may overlap with LTE slot 3 and may correspond to a relatively small BLER for an LTE Rx antenna. By contrast, another NR slot for SRS Tx may overlap with LTE slot 8 and may result in a relatively high BLER (above a BLER threshold) at the LTE Rx antenna. Accordingly, as the examples of FIGS. 9-11 may be generally applicable to certain NSA band combinations (e.g., LTE B3 and NR n41 combinations), scenarios in which 2Tx communications (e.g., 2T4R) are implemented may exacerbate the already inherent adverse effects of problematic band combinations, thus highlighting the benefits of solutions for dynamically switching between 2T4R and 1T4R.

Referring to FIGS. 7-8, process 700 may include determining that UE 210 and base station 222 support 1T4R and 2T4R communications, and 1T4R-2T4R switching (block 710). For example, UE 210 may send and receive information, from base station 222, about device capabilities and control information for 1T4R and 2T4R communications, and 1T4R-2T4R switching. For purposes of explaining process 700, assume that base station 222 has provided UE 210 with control information to cause UE 210 to communicate with base station 222 via 2T4R in an NSA scenario. NSA may include a scenario in which baes station 222 supports 3GPP 5G or NR communication standards using a 4G network infrastructure. For example, UE 210 may connect to base station 222 using 5G radio frequencies for data-throughput while using 4G radio frequencies for control or non-data purposes.

Process 700 may include communicating using 2T4R communications in an NSA scenario (block 720). For example, UE 210 may configure itself to communicate with base station 222 using 2T4R communications in an NSA environment. In such scenarios, some communications may use 5G radio frequencies while others may use 4G radio frequencies (as referred to as 5G bands and 4G bands, respectively). Additionally, or alternatively, UE 210 may determine whether 2T4R communications are problematic for a combination of bands (e.g., 5G bands and 4G bands) used by UE 210 for NSA communications.

For example, UE 210 may receive from base station 222 and/or store locally a dataset comprising combinations of NSA frequency bands known to experience DL signal quality degradation when 2T4R is used. An example of such NSA band combinations may include using frequency band 3 (B3) of the 4G LTE 3GPP communication standards and an n41 frequency band designated by the 5G NR 3GPP communication standards. In 5G, NR bands may be identified using the prefix "n", and when the NR band overlaps a 4G LTE band, they may share the same band number. 2T4R communications may be problematic for one or more additional or alternative bands or band combinations. In some implementations, 2T4R may be problematic for certain band combinations for certain types of UEs 210 and/or UEs 210 with certain types of antennas or other components. In such implementations, UE 210 may include a dataset comprising band combinations that are problematic of the UE (e.g., for that type of UE). Alternatively, UE 210 may include a dataset comprising band combinations that are problematic for multiple types of UEs 210. In such implementations, UE 210 may determine a relevant UE type for UE 210 and map the UE type to problematic band combination to determine whether a current band combination is problematic for 2T4R communications.

When 2T4R is not problematic for a current NSA band combination (block 730—NO), process 700 may proceed with continuing to use 2T4R communications (block 750). For example, when UE 210 determines that using 2T4R communications does not adversely affect an NSA band combination being used by UE 210 and base station 222, UE 210 may continue using 2T4R. Additionally, in the event that the NSA band combination changes, UE 210 may repeat one or more of the operations of process 700, such as determining whether 2T4R is problematic for the new NSA band combination and/or UE type.

When 2T4R is problematic for the current NSA band combination (block 730—YES), process 700 may proceed with UE 210 entering an evaluation period (represented by T_evaluation_period) (block 740). An evaluation period may include a pre-selected amount of time (e.g., one or more slots) for UE 210 to evaluate signal and/or channel conditions (e.g., DL conditions) between UE 210 and base station 222. For example, an NR secondary cell group (SCG) SRS 2Tx (e.g., 2T4R SRS) signal may interrupt LTE Rx antennas during one or more slots. As such, UE 210 may monitor DL receiver performance during the evaluation period to determine whether the performance, throughput, signal quality, etc., is less than a corresponding threshold (e.g., a performance threshold). In other words, UE 210 may determine whether the performance of DL slots impacted by using 2T4R and the NSA band combinations is less than a pre-selected or pre-specified performance threshold. The performance of the DL slots may be measured in terms of one or more characteristics, such as throughput, signal quality, signal strengths, etc.

When the performance is not less than the performance threshold (block 760—NO), process may include continuing to use 2T4R communications (block 750). For example, when UE 210 determines that using 2T4R communications does not adversely affect an NSA band combination beyond a performance threshold, UE 210 may continue using 2T4R communications. When the performance is less than the performance threshold, UE 210 may report a different RANK value based on base station 222 implementations. For example, UE 210 may provide base station 222 with an RRC message or another type of message that includes a "RANK=2" indicator when base station 222 configures from 2T4R to 1T4R. By contrast, as described below, in some implementations, base station 222 may correspond to an LTE master cell group (MCG) and UE 210 may send a message or signal to report a "RANK=1" value to base station 222 when base station 222 keeps 2T4R configuration. Additionally, in the event that the NSA band combination changes, UE 210 may repeat one or more of the operations of process 700, such as determining whether 2T4R is problematic for the new NSA band combination and/or UE type and so on.

Referring to FIGS. 7 and 8, when the performance is less than the performance threshold (block 760—YES), process 700 may include reporting a performance problem (block 810). For example, when UE 210 determines that using 2T4R communications adversely affects an NSA band combination beyond a performance threshold, UE 210 may report a performance problem (block 810). For example, UE 210 may provide base station 222 with an RRC message or another type of message that includes a "RANK=1" indicator. In some implementations, base station 222 may correspond to an LTE MCG and UE 210 may send a message or signal to report a "RANK=1" value to base station 222. In such implementations, reporting the "RANK=1" value may be triggered when base station 222 maintains a 2T4R configuration. When communications between UE 210 and base station 222 switch from 2T4R to 1T4R communications, UE 210 may report "RANK=2" which may be consistent with existing standards for 1T4R communication scenarios.

Process 700 may include determining whether to switch to 1T4R (block 820). For example, UE 210 may determine whether to switch from 2T4R to 1T4R communications based on information and/or instructions (e.g., control information) from base station 222. In some implementations, upon receiving a report from UE 210 regarding a performance problem relating to 2T4R communications, base station 222 may determine that UE 210 is to change from 2T4R to 1T4R communications. In some implementations, base station 222 may provide UE 210 with information and/or instructions (e.g., control information) to cause UE 210 to switch from 2T4R to 1T4R communications. As such, UE 210 may determine whether to switch from 2T4R to 1T4R based on (e.g., not until) UE 110 receives a signal to do so. As such, so long as UE 210 does not receive information and/or instructions to switch to 1T4R (block 820—NO), process 700 may include continuing to use 2T4R communications (block 830). By contrast, when UE 210 receives information and/or instructions to switch to 1T4R (block 820—YES), process 700 may include switching from 2T4R to 1T4R communications (block 840).

As such, process 700 may provide a solution to mitigating inherently problematic NSA band combinations that may be exacerbated by 2T4R communications by switching to 1T4R communications. Process 700 may be performed by UE 210 regardless of whether base station 222 is aware of or participates in the switch from 2T4R communications to 1T4R communications. In other words, process 700 may provide for UE 210 transitioning from 2T4R to 1T4R communications in problematic NSA band combination scenarios regardless of whether base station 222 is aware of adversely impacted LTE slots and/or configured to cause or trigger the transition from 2T4R to 1T4R communications. By contrast, in some implementations, process 700 may be performed in combination with a corresponding process supported by base station 222, in which case base station 222 may, for example, identify a problematic NSA band combination, initiate a transition from 2T4R to 1T4R communications, etc.

Figure 12:
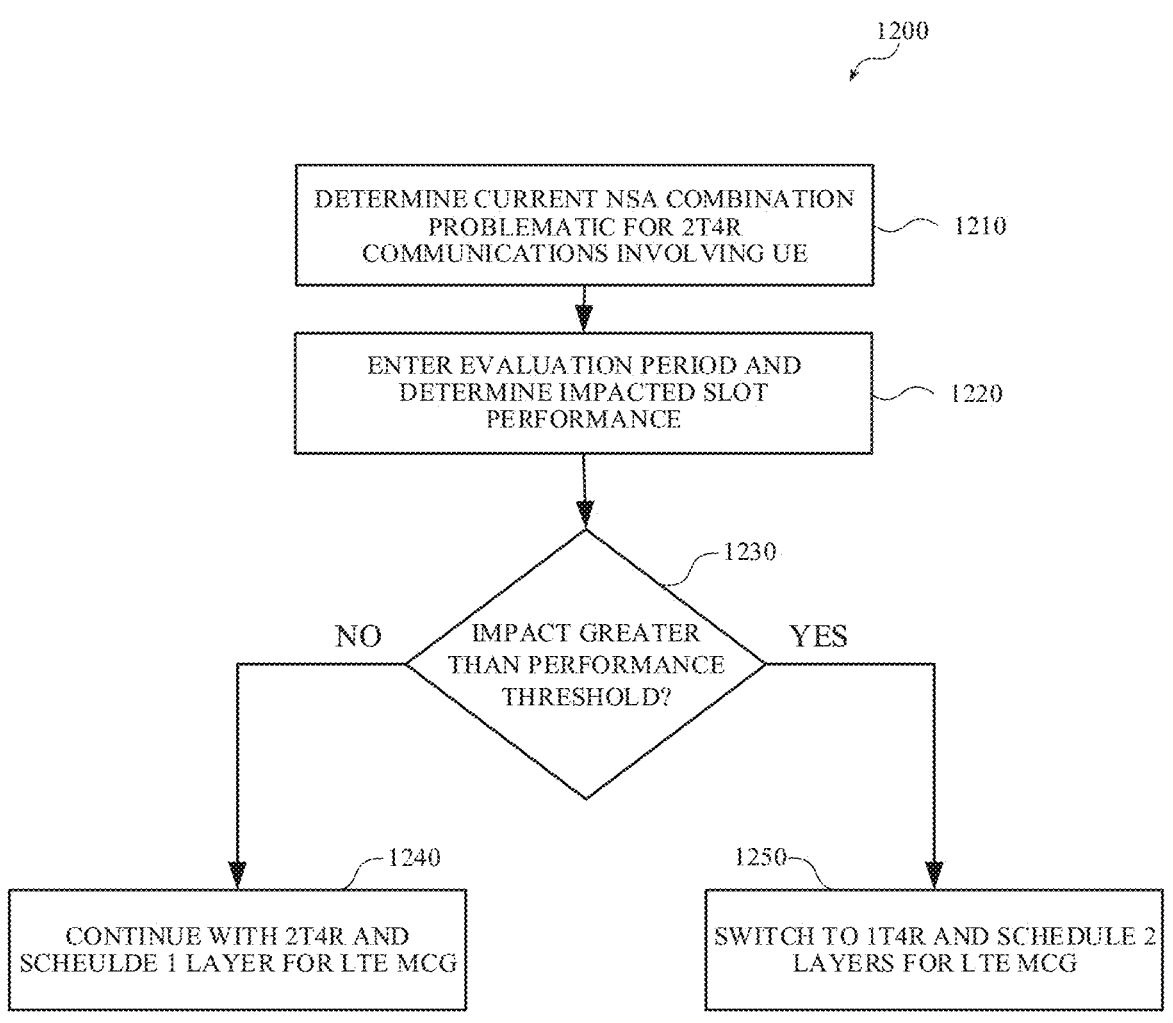
FIG. 12 is a diagram of an example process 1200 for dynamic adaptation of 1T4R and 2T4R communications in an NSA environment according to one or more implementations described herein.

FIG. 12 is a diagram of an example process 1200 for dynamic adaptation of 1T4R and 2T4R communications in an NSA environment according to one or more implementations described herein. Process 1200 may be implemented by base station 222. In some implementations, some or all of process 1200 may be performed by one or more other systems or devices, including one or more of the devices of FIG. 2. Additionally, process 1200 may include one or more fewer, additional, differently ordered and/or arranged operations than those shown in FIG. 12. In some implementations, some or all of the operations of process 1200 may be performed independently, successively, simultaneously, etc., of one or more of the other operations of process 1200. As such, the techniques described herein are not limited to a number, sequence, arrangement, timing, etc., of the operations or process depicted in FIG. 12. Process 1200 may be implemented as a network counterpart process (e.g., in conjunction with) the process FIGS. 7-8. More particularly, process 1200 may be implemented to address or mitigate inherent, self-interfering NSA band combinations (e.g., LTE B3 and NR n41 combinations), which highlight benefits of solutions for dynamically switching between 2T4R and 1T4R.

As shown, process 1200 may include determining that a current NSA band combination is problematic for 2T4R communications involving UE 210 (block 1210). For example, base station 222 may determine that 2T4R communication is problematic for an NSA band combination allocated to communicate with UE 210. As described above with reference FIGS. 9-11, some NSA band combinations (e.g., a B3 band of the 4G LTE 3GPP communications standards and an n41 band of the 5G NR 3GPP communications standards) may be inherently self-conflicting, and the self-conflicting implications of such combinations may be exacerbated by 2T4R communications. In some implementations, base station 222 may locally store and/or have access to a dataset that indicates NSA band combinations that may be exacerbated by 2T4R communications. In such implementations, base station 222 may determine that a current NSA band combination is problematic by, for example, comparing the current NSA band combination with the dataset.

Process 1200 may include entering an evaluation period and determining an impacted slot performance (block 1220). For example, in response to determining that an NSA band combination is problematic, base station 222 may enter an evaluation period and determine (during the evaluation period) whether UE 210 is being adversely impacted by the problematic NSA band combination. This may include determining whether one or more LTE slots are negatively impacted (e.g., measured by a BLER and corresponding BLER threshold) by corresponding NR SRS 2Tx communications. As described above with reference to FIG. 11, an LTE slot may be negatively impacted by a corresponding NR SRS Tx when a BLER rate for the LTE slot equals or exceeds a pre-selected BLER threshold.

When the performance impact is not greater than the performance threshold (block 1230), process 1200 may include continuing with 2T4R and may schedule 1 layer in LTE MCG (block 1240). For example, when an NSA band combination is problematic but a corresponding slot performance does not exceed a slot performance threshold, base station 222 may continue communicating with UE 210 using 2T4R. Additionally, or alternatively, base station 222 may schedule 1 layer in the corresponding LTE MCG. Scheduling 1 layer in the LTE MCG, as described herein, may include base station 222 may schedule PDSCH with 1 layer regardless of UE RANK reporting. Layer 1 scheduling may reduce adverse effects of a 2T4R configuration.

When the performance impact is greater than the performance threshold (block 1230), process 1200 may include switching to 1T4R and may schedule 2 layers in LTE MCG (block 1250). For example, when an NSA band combination is problematic and a corresponding slot performance does exceed a slot performance threshold, base station 222 may communicate with UE 210 to cause NR SRS Tx signals to switch from 2T4R communications to 1T4R communications. Additionally, or alternatively, base station 222 may schedule 2 layers in the corresponding LTE MCG. Scheduling 2 layers in the LTE MCG, as described herein, may include base station 222 may schedule a PDSCH with 2 layers regardless of UE RANK reporting. Layer 2 scheduling may help reduce adverse effects of a 1T4R configuration. As described above with reference to, for example, FIGS. 9-11, transitioning from 2T4R communications to 1T4R communications may decrease interference or adverse effects (e.g., a BLER) of inherently problematic NSA band combinations, such as (e.g., a B3 band of the 4G LTE 3GPP communications standards and an n41 band of the 5G NR 3GPP communications standards). Accordingly, one or more of the techniques described herein may include solutions for transition from 2T4R to 1T4R communications based on whether a problematic (e.g., self-interfering (NSA band communication is being used and/or whether a performance LTE slots, corresponding to NR SRS transmissions, are being adversely affected beyond a performance threshold.

Figure 13:
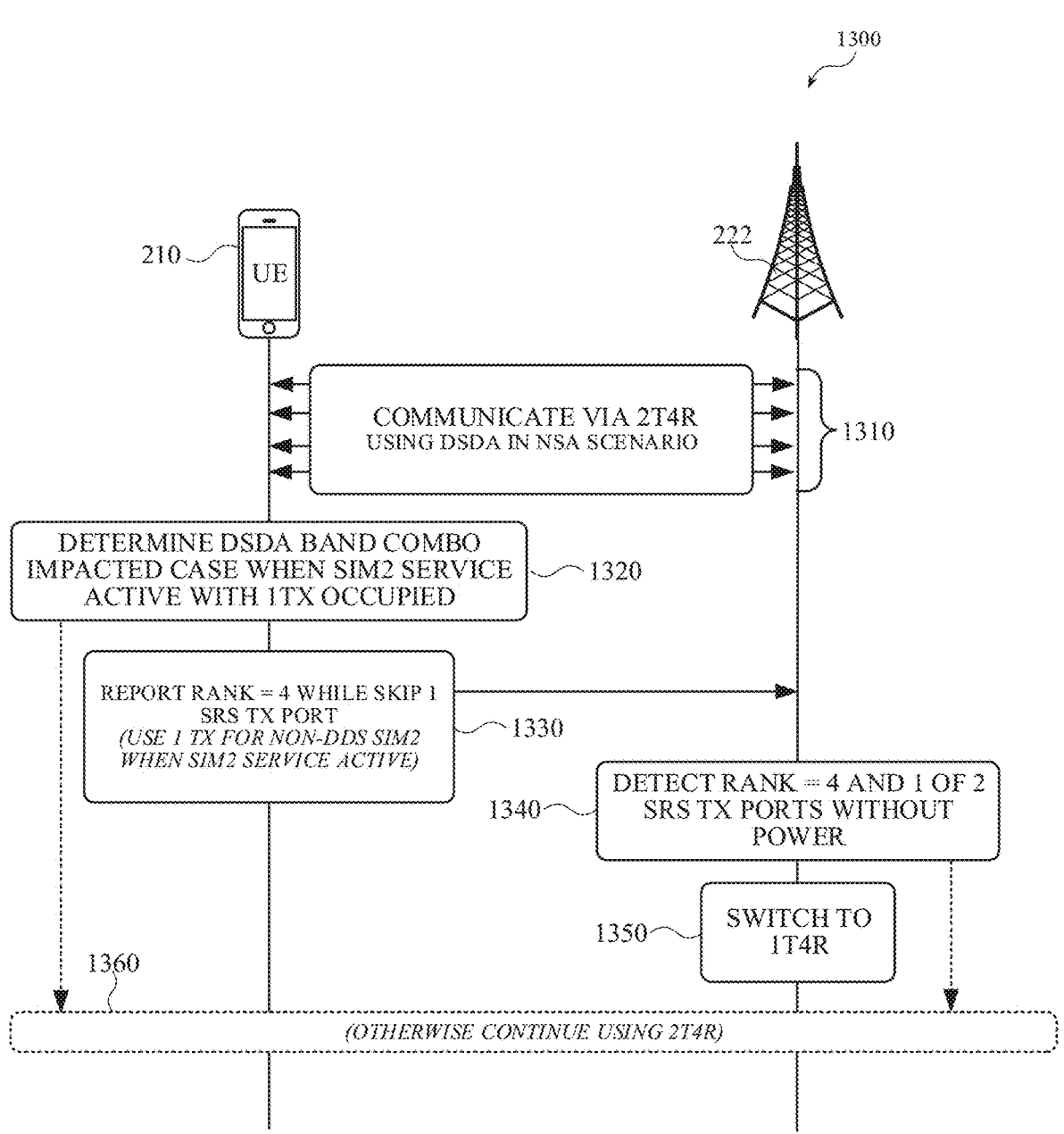
FIG. 13 is a diagram of an example process for dynamic adaptation of 1T4R and 2T4R communications in a dual subscriber identity module (SIM) dual active (DSDA) scenario according to one or more implementations described herein.

FIG. 13 is a diagram of an example process 1300 for dynamic adaptation of 1T4R and 2T4R communications in a DSDA scenario according to one or more implementations described herein. Process 1300 may be implemented by UE 210 and/or one or more base station 222. In some implementations, process 1300 may be implemented in a NSA environment. In some implementations, some or all of process 1300 may be performed by one or more other systems or devices, including one or more of the devices of FIG. 2. Additionally, process 1300 may include one or more fewer, additional, differently ordered and/or arranged operations than those shown in FIG. 13. In some implementations, some or all of the operations of process 1300 may be performed independently, successively, simultaneously, etc., of one or more of the other operations of process 1300. As such, the techniques described herein are not limited to a number, sequence, arrangement, timing, etc., of the operations or process depicted in FIG. 13.

Process 1300 may include communicating with base station 222 via 2T4R using DSDA in a NSA scenario (block 1310). For example, UE 110 may communicate with one or more base stations 222 using DSDA in a NSA scenario. An NSA scenario may include a network environment that supports 5G NR and 4G LTE communications between UE 110 and one or more base stations 222. For example, 5G-enabled UEs may connect to 5G frequencies for data-throughput while using 4G for non-data duties. In some implementations, base stations 222 may include a PCell and a SCell.

DSDA may include a scenario in which UE 210 is capable of communicating with base station 222 using two SIM cards, such that UE 210 may handle two different network subscriptions, which may each be transmitting and/or receiving simultaneously. In some implementations, although DSDS devices (e.g., UE 210) may be configured with two different network subscriptions, only one of the subscriptions may support a data connection. Unlike voice services that may have a specific phone number associated with each subscription, having data services on one subscription is often sufficient to provide all the data services needed by the user independent of the other subscription. With this configuration, a DSDS device may have one network subscription for both data and voice services and the other subscription intended for only providing voice communications. Data services activated on only one subscription and the corresponding network subscription for such data services may be referred to herein as a DDS. Services that, for example, support voice calls only may be referred to as voice-only service or non-DDS services, and network subscriptions primarily providing voice communications are referred to herein as non-DDS.

As shown, process 1300 may include UE 210 determining that a band combination used for DSDA communications (e.g., a DSDA band combination) is problematic when SIM2 services are active with 1Tx being occupied (block 1320). For example, NSA connectivity may involve a B3 band of the 4G LTE 3GPP communications standards and an n41 band of the 5G NR 3GPP communications standards. DL performance of the 4G LTE band may be adversely affected by SRS Tx sent from UE 210 to a SCG via the 5G NR band, especially when UE 210 is using 2T4R to send SRSs. For example, though not shown, UE 210 may receive from base station 222 and/or store locally a dataset comprising combinations of NSA frequency bands known to experience quality degradation when 2T4R is used with DSDA.

An example of such NSA band combinations may include using the B3 band of the 4G LTE 3GPP communication standards and the n41 frequency band of the 5G NR 3GPP communication standards. In some implementations, 2T4R may be problematic for certain band combinations for certain types of UEs 210 and/or UEs 210 with certain types of antennas or other components. In such implementations, UE 210 may include a dataset comprising band combinations that are problematic for the UE (e.g., for a particular type of UE). Alternatively, UE 210 may include a dataset comprising band combinations that are problematic for multiple types of UEs 210. In such implementations, UE 210 may determine a relevant UE type for UE 210 and map the UE type to problematic band combination to determine whether a current band combination is problematic when used with 2T4R communications for UL SRS. In some implementations, UE 210 may also, or alternately, determine whether SIM2 services are active with 1Tx being occupied. As described herein, 1Tx being occupied may include a scenario in which SIM2 call services may need 1Tx for transmitting voice packets while SIM1 only has 1Tx available for data service.

As shown, when UE 210 does not determine that the band combination used for DSDA is a conflicted case (e.g., problematic) when SIM2 services are active with 1Tx being occupied (block 1320), process 1300 may include continuing to communicate with base stations 222 using 2T4R communications (block 1360). By contrast, when UE 210 determines that the band combination used for DSDA is a conflicted case (e.g., problematic) when SIM2 services are active with 1Tx being occupied, process 1300 may include UE 210 reporting RANK=4 while skipping 1 Tx SRS port of the 2T4R communications (block 1330) on SIM1. As described herein, reporting RANK=4 on SIM1 may indicate, to base stations 222 that 4 layers can be scheduled for high DL throughput and SIM1 DL scheduling is not impacted even there is only 1Tx on SIM1. Additionally, or alternatively, UE 210 may use 1 Tx for non-DDS SIM2 when SIM2 service is active. SIM2 service may include scenarios in which UE 210 transmits and/or receives using both SIM cards simultaneously.

One or more of base stations 222 may detect UE 210 reporting RANK=4 and detect that 1 Tx SRS port of the 2T4R communications is without power (block 1340). This may include base stations 222 detecting that one of two SRS ports are without Tx power since UE 210 discontinued (e.g., began skipping) 1 SRS Tx port used for 2T4R communications. In response, one or more of base stations 222 may switch from using 2T4R communications to 1T4R communications (block 1350). This may include base station 222 allocating PDSCH DL resources based on an assumption that UE 210 is using 1T4R communications, instead of 2T4R communications, for SRS. In some implementations, doing so may include base stations 222 switching from using 2T4R communications for DDS SIM1 DL performance measurements and allocations to using 1T4R communications for DDS SIM1 DL performance measurements and allocations. As shown, process 1300 may include UE 210 and base stations 222 communicating via 1T4R. By contrast, when base station 222 does not detect UE 210 reporting RANK=4 and/or detect that 1 Tx SRS port of the 2T4R communications is without power (block 1340), process 1300 may include continuing UE 210 and base stations 222 continuing to communicate using 2T4R communications (block 1360).

Figure 14:
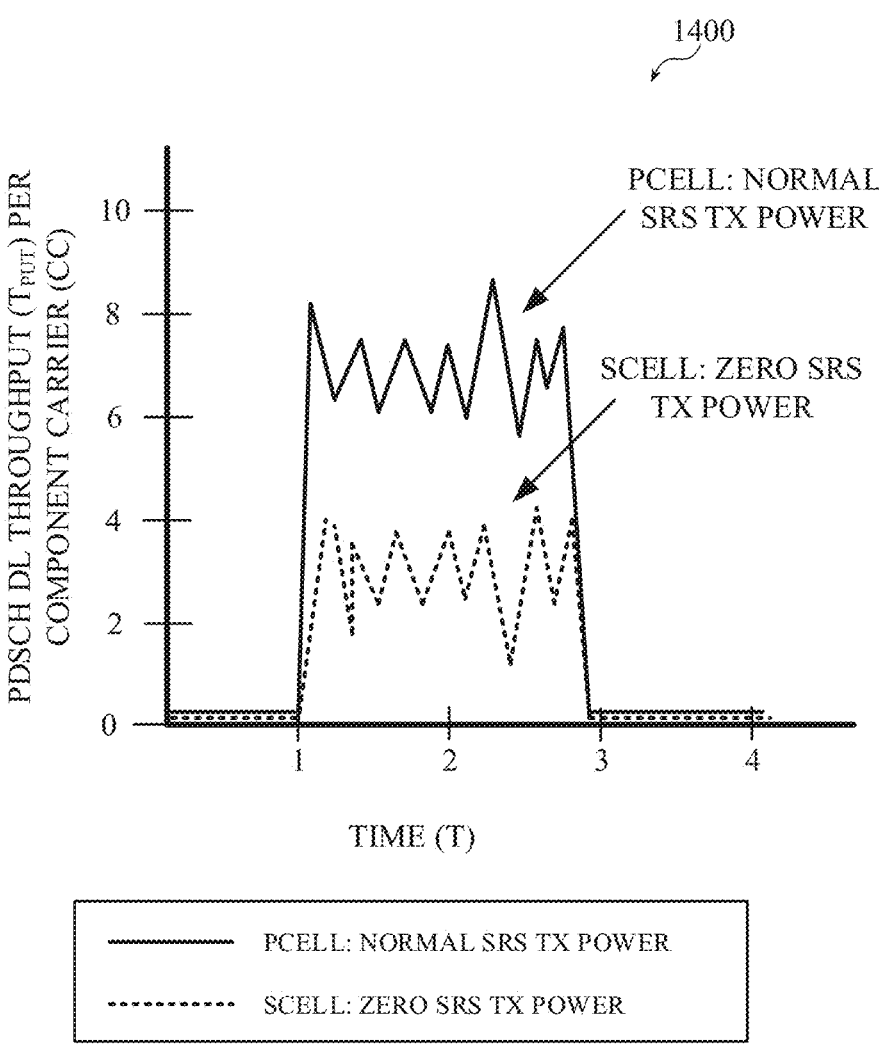
FIG. 14 is a diagram of an example performance aspects relevant to 1T4R and 2T4R communications in a DSDA scenario according to one or more implementations described herein.

FIG. 14 is a diagram of an example table 1400 pertaining to 1T4R and 2T4R communications in a DSDA scenario according to one or more implementations described herein. As shown, table 1400 may include a vertical axis representing PDSCH DL throughput ($T_{put}$) per CC and a horizontal axis representing time (T). Table 1400 may indicate a change in PCell performance at a normal SRS Tx power and a change in SCell performance at a zero SRS Tx power. Table 1400 may correspond to a scenario in which a problematic band combination is being used for 2T4R communications, such that UL SRS transmissions may not arrive at base station 222 (e.g., the SCell). In such scenarios, the network may respond by allocating or scheduling PDSCH DL resources (e.g., a lower RANK, modulation and coding scheme (MCS), priority, quality index, etc.) resulting in a lower throughput. The techniques described herein, including one or more of the operations describe above with reference to FIG. 13, may be implemented to minimize or reduce the negative effects of problematic band combinations in DSDA scenarios by, for example, changing the reporting procedures of UE 210.

Figure 15:
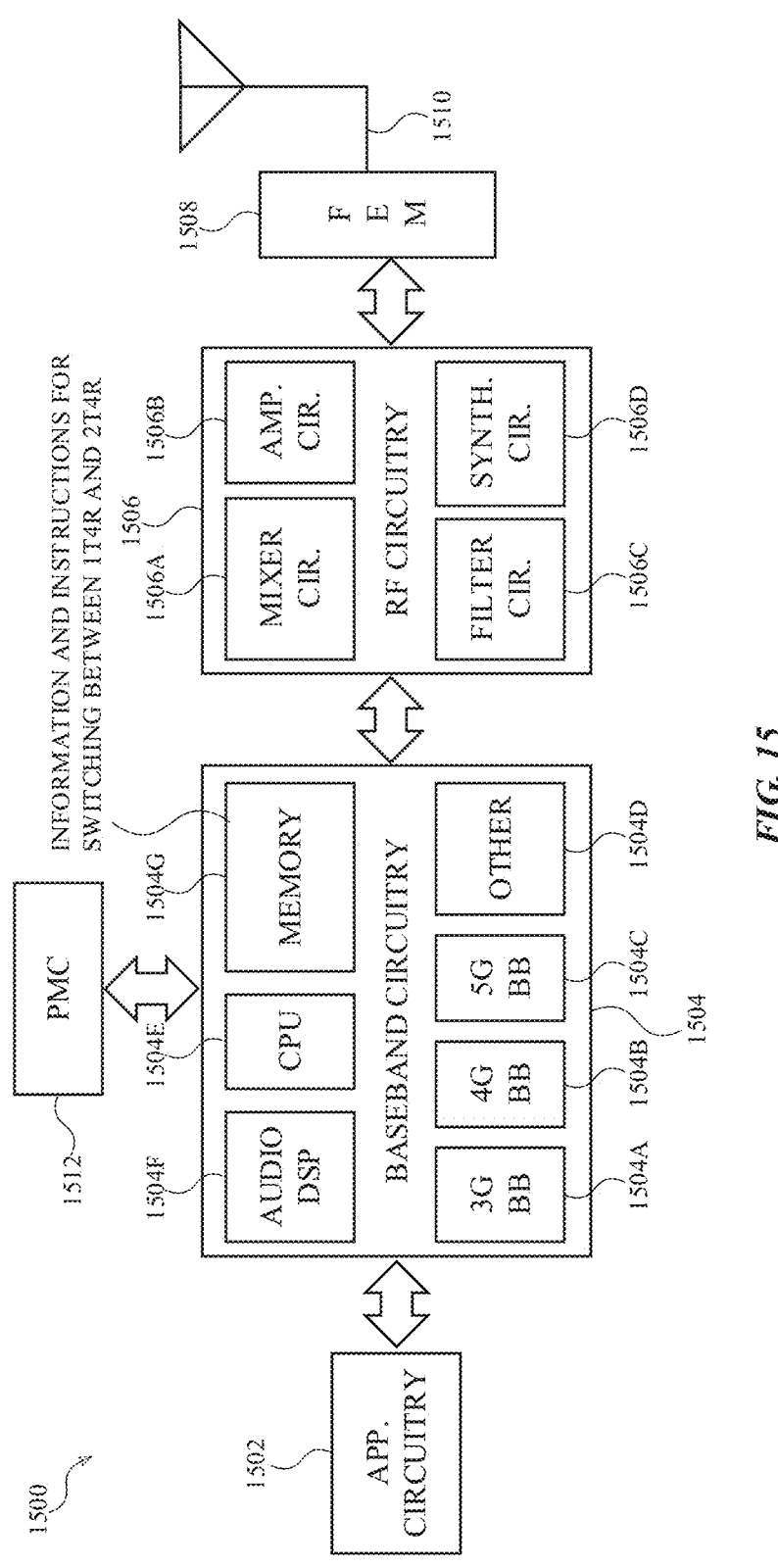
FIG. 15 is a diagram of an example of control plane protocol stack in accordance with one or more implementations described herein.

FIG. 15 is a diagram of an example of components of a device according to one or more implementations described herein. In some implementations, the device 1500 can include application circuitry 1502, baseband circuitry 1504, RF circuitry 1506, front-end module (FEM) circuitry 1508, one or more antennas 1510, and power management circuitry (PMC) 1512 coupled together at least as shown. The components of the illustrated device 1500 can be included in a UE or a RAN node. In some implementations, the device 1500 can include fewer elements (e.g., a RAN node may not utilize application circuitry 1502, and instead include a processor/controller to process IP data received from a CN or an Evolved Packet Core (EPC)). In some implementations, the device 1500 can include additional elements such as, for example, memory/storage, display, camera, sensor (including one or more temperature sensors, such as a single temperature sensor, a plurality of temperature sensors at different locations in device 1500, etc.), or input/output (I/O) interface. In other implementations, the components described below can be included in more than one device (e.g., said circuitries can be separately included in more than one device for Cloud-RAN (C-RAN) implementations).

The application circuitry 1502 can include one or more application processors. For example, the application circuitry 1502 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 1500. In some implementations, processors of application circuitry 1502 can process IP data packets received from an EPC.

The baseband circuitry 1504 can include circuitry such as, but not limited to, one or more single-core or multi-core processors. The baseband circuitry 1504 can include one or more baseband processors or control logic to process baseband signals received from a receive signal path of the RF circuitry 1506 and to generate baseband signals for a transmit signal path of the RF circuitry 1506. Baseband circuitry 1504 can interface with the application circuitry 1502 for generation and processing of the baseband signals and for controlling operations of the RF circuitry 1506. For example, in some implementations, the baseband circuitry 1504 can include a 3G baseband processor 1504A, a 4G baseband processor 1504B, a 5G baseband processor 1504C, or other baseband processor(s) 1504D for other existing generations, generations in development or to be developed in the future (e.g., 5G, 6G, etc.). The baseband circuitry 1504 (e.g., one or more of baseband processors 1504A-D) can handle various radio control functions that enable communication with one or more radio networks via the RF circuitry 1506. In other implementations, some or all of the functionality of baseband processors 1504A-D can be included in modules stored in the memory 1504G and executed via a Central Processing Unit (CPU) 1504E. The radio control functions can include, but are not limited to, signal modulation/demodulation, encoding/decoding, radio frequency shifting, etc. In some implementations, modulation/demodulation circuitry of the baseband circuitry 1504 can include Fast-Fourier Transform (FFT), precoding, or constellation mapping/de-mapping functionality. In some implementations, encoding/decoding circuitry of the baseband circuitry 1504 can include convolution, tail-biting convolution, turbo, Viterbi, or Low-Density Parity Check (LDPC) encoder/decoder functionality. Implementations of modulation/demodulation and encoder/decoder functionality are not limited to these examples and can include other suitable functionality in other implementations.

In some implementations, memory 1504G may receive and/or store information and instructions for performing communications using, and switching between, 1T4R and 2T4R as described herein. For example, UE 210 and base station 222 may communicate with one another using 2T4R communications. UE 110 and/or base station 222 may detect and evaluate a signal quality trigger and/or condition relating to switching from T2R4 communications to T1R4 communications. The trigger and/or condition may correspond to a channel or radio frequency (RF) quality, conflicting or problematic band combinations being used in an NSA scenario, whether DDS SIM or non-DDS SIM is being used in a DSDA scenario, etc. Based on the evaluation, UE 210 and base station 222 may continue using T2R4 communications or switch to T1R4 communications. Switching from T2R4 communications to T1R4 communications may, for example, improve the quality and reliability of SRS from UE 210 and in turn enhance an ability of base station 222 for channel estimation and ensure proper quality and DL performance.

In some implementations, the baseband circuitry 1504 can include one or more audio digital signal processor(s) (DSP) 1504F. The audio DSPs 1504F can include elements for compression/decompression and echo cancellation and can include other suitable processing elements in other implementations. Components of the baseband circuitry can be suitably combined in a single chip, a single chipset, or disposed on a same circuit board in some implementations. In some implementations, some or all of the constituent components of the baseband circuitry 1504 and the application circuitry 1502 can be implemented together such as, for example, on a system on a chip (SOC).

In some implementations, the baseband circuitry 1504 can provide for communication compatible with one or more radio technologies. For example, in some implementations, the baseband circuitry 1504 can support communication with a NG-RAN, an evolved universal terrestrial radio access network (EUTRAN) or other wireless metropolitan area networks (WMAN), a wireless local area network (WLAN), a wireless personal area network (WPAN), etc. Implementations in which the baseband circuitry 1504 is configured to support radio communications of more than one wireless protocol can be referred to as multi-mode baseband circuitry.

RF circuitry 1506 can enable communication with wireless networks using modulated electromagnetic radiation through a non-solid medium. In various implementations, the RF circuitry 1506 can include switches, filters, amplifiers, etc. to facilitate the communication with the wireless network. RF circuitry 1506 can include a receive signal path which can include circuitry to down-convert RF signals received from the FEM circuitry 1508 and provide baseband signals to the baseband circuitry 1504. RF circuitry 1506 can also include a transmit signal path which can include circuitry to up-convert baseband signals provided by the baseband circuitry 1504 and provide RF output signals to the FEM circuitry 1508 for transmission.

In some implementations, the receive signal path of the RF circuitry 1506 can include mixer circuitry 1506A, amplifier circuitry 1506B and filter circuitry 1506C. In some implementations, the transmit signal path of the RF circuitry 1506 can include filter circuitry 1506C and mixer circuitry 1506A. RF circuitry 1506 can also include synthesizer circuitry 1506D for synthesizing a frequency for use by the mixer circuitry 1506A of the receive signal path and the transmit signal path. In some implementations, the mixer circuitry 1506A of the receive signal path can be configured to down-convert RF signals received from the FEM circuitry 1508 based on the synthesized frequency provided by synthesizer circuitry 1506D. The amplifier circuitry 1506B can be configured to amplify the down-converted signals and the filter circuitry 1506C can be a low-pass filter (LPF) or band-pass filter (BPF) configured to remove unwanted signals from the down-converted signals to generate output baseband signals. Output baseband signals can be provided to the baseband circuitry 1504 for further processing. In some implementations, the output baseband signals can be zero-frequency baseband signals, although this is not a requirement. In some implementations, mixer circuitry 1506A of the receive signal path can comprise passive mixers, although the scope of the implementations is not limited in this respect.

In some implementations, the mixer circuitry 1506A of the transmit signal path can be configured to up-convert input baseband signals based on the synthesized frequency provided by the synthesizer circuitry 1506D to generate RF output signals for the FEM circuitry 1508. The baseband signals can be provided by the baseband circuitry 1504 and can be filtered by filter circuitry 1506C.

In some implementations, the mixer circuitry 1506A of the receive signal path and the mixer circuitry 1506A of the transmit signal path can include two or more mixers and can be arranged for quadrature down conversion and up conversion, respectively. In some implementations, the mixer circuitry 1506A of the receive signal path and the mixer circuitry 1506A of the transmit signal path can include two or more mixers and can be arranged for image rejection (e.g., Hartley image rejection). In some implementations, the mixer circuitry 1506A of the receive signal path and the mixer circuitry 1406A can be arranged for direct down conversion and direct up conversion, respectively. In some implementations, the mixer circuitry 1506A of the receive signal path and the mixer circuitry 1506A of the transmit signal path can be configured for super-heterodyne operation.

In some implementations, the output baseband signals, and the input baseband signals can be analog baseband signals, although the scope of the implementations is not limited in this respect. In some alternate implementations, the output baseband signals, and the input baseband signals can be digital baseband signals. In these alternate implementations, the RF circuitry 1506 can include analog-to-digital converter (ADC) and digital-to-analog converter (DAC) circuitry and the baseband circuitry 1504 can include a digital baseband interface to communicate with the RF circuitry 1506.

In some dual-mode implementations, a separate radio IC circuitry can be provided for processing signals for each spectrum, although the scope of the implementations is not limited in this respect.

In some implementations, the synthesizer circuitry 1506D can be a fractional-N synthesizer or a fractional N/N+1 synthesizer, although the scope of the implementations is not limited in this respect as other types of frequency synthesizers can be suitable. For example, synthesizer circuitry 1506D can be a delta-sigma synthesizer, a frequency multiplier, or a synthesizer comprising a phase-locked loop with a frequency divider.

The synthesizer circuitry 1506D can be configured to synthesize an output frequency for use by the mixer circuitry 1506A of the RF circuitry 1506 based on a frequency input and a divider control input. In some implementations, the synthesizer circuitry 1506D can be a fractional N/N+1 synthesizer.

In some implementations, frequency input can be provided by a voltage-controlled oscillator (VCO), although that is not a requirement. Divider control input can be provided by either the baseband circuitry 1504 or the applications circuitry 1502 depending on the desired output frequency. In some implementations, a divider control input (e.g., N) can be determined from a look-up table based on a channel indicated by the applications circuitry 1502.

Synthesizer circuitry 1506D of the RF circuitry 1506 can include a divider, a delay-locked loop (DLL), a multiplexer and a phase accumulator. In some implementations, the divider can be a dual modulus divider (DMD) and the phase accumulator can be a digital phase accumulator (DPA). In some implementations, the DMD can be configured to divide the input signal by either N or N+1 (e.g., based on a carry out) to provide a fractional division ratio. In some example implementations, the DLL can include a set of cascaded, tunable, delay elements, a phase detector, a charge pump and a D-type flip-flop. In these implementations, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some implementations, synthesizer circuitry 1506D can be configured to generate a carrier frequency as the output frequency, while in other implementations, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some implementations, the output frequency can be a LO frequency (fLO). In some implementations, the RF circuitry 1506 can include an IQ/polar converter.

FEM circuitry 1508 can include a receive signal path which can include circuitry configured to operate on RF signals received from one or more antennas 1510, amplify the received signals and provide the amplified versions of the received signals to the RF circuitry 1506 for further processing. FEM circuitry 1508 can also include a transmit signal path which can include circuitry configured to amplify signals for transmission provided by the RF circuitry 1506 for transmission by one or more of the one or more antennas 1510. In various implementations, the amplification through the transmit or receive signal paths can be done solely in the RF circuitry 1506, solely in the FEM circuitry 1508, or in both the RF circuitry 1506 and the FEM circuitry 1508.

In some implementations, the FEM circuitry 1508 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 1506). The transmit signal path of the FEM circuitry 1508 can include a power amplifier (PA) to amplify input RF signals (e.g., provided by RF circuitry 1506), and one or more filters to generate RF signals for subsequent transmission (e.g., by one or more of the one or more antennas 1510).

In some implementations, the PMC 1512 can manage power provided to the baseband circuitry 1504. In particular, the PMC 1512 can control power-source selection, voltage scaling, battery charging, or DC-to-DC conversion. The PMC 1512 can often be included when the device 1500 is capable of being powered by a battery, for example, when the device is included in a UE. The PMC 1512 can increase the power conversion efficiency while providing desirable implementation size and heat dissipation characteristics.

While FIG. 15 shows the PMC 1512 coupled only with the baseband circuitry 1504. However, in other implementations, the PMC 1512 may be additionally or alternatively coupled with, and perform similar power management operations for, other components such as, but not limited to, application circuitry 1502, RF circuitry 1506, or FEM circuitry 1508.

In some implementations, the PMC 1512 can control, or otherwise be part of, various power saving mechanisms of the device 1500. For example, if the device 1500 is in an RRC_Connected state, where it is still connected to the RAN node as it expects to receive traffic shortly, then it can enter a state known as Discontinuous Reception Mode (DRX) after a period of inactivity. During this state, the device 1500 can power down for brief intervals of time and thus save power.

If there is no data traffic activity for an extended period of time, then the device 1500 can transition off to an RRC_Idle state, where it disconnects from the network and does not perform operations such as channel quality feedback, handover, etc. The device 1500 goes into a very low power state and it performs paging where again it periodically wakes up to listen to the network and then powers down again. The device 1500 may not receive data in this state; in order to receive data, it can transition back to RRC_Connected state.

An additional power saving mode can allow a device to be unavailable to the network for periods longer than a paging interval (ranging from seconds to a few hours). During this time, the device is unreachable to the network and can power down completely. Any data sent during this time incurs a large delay and it is assumed the delay is acceptable.

Processors of the application circuitry 1502 and processors of the baseband circuitry 1504 can be used to execute elements of one or more instances of a protocol stack. For example, processors of the baseband circuitry 1504, alone or in combination, can be used execute Layer 3, Layer 2, or Layer 1 functionality, while processors of the baseband circuitry 1504 can utilize data (e.g., packet data) received from these layers and further execute Layer 4 functionality (e.g., transmission communication protocol (TCP) and user datagram protocol (UDP) layers). As referred to herein, Layer 3 can comprise a RRC layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 16:
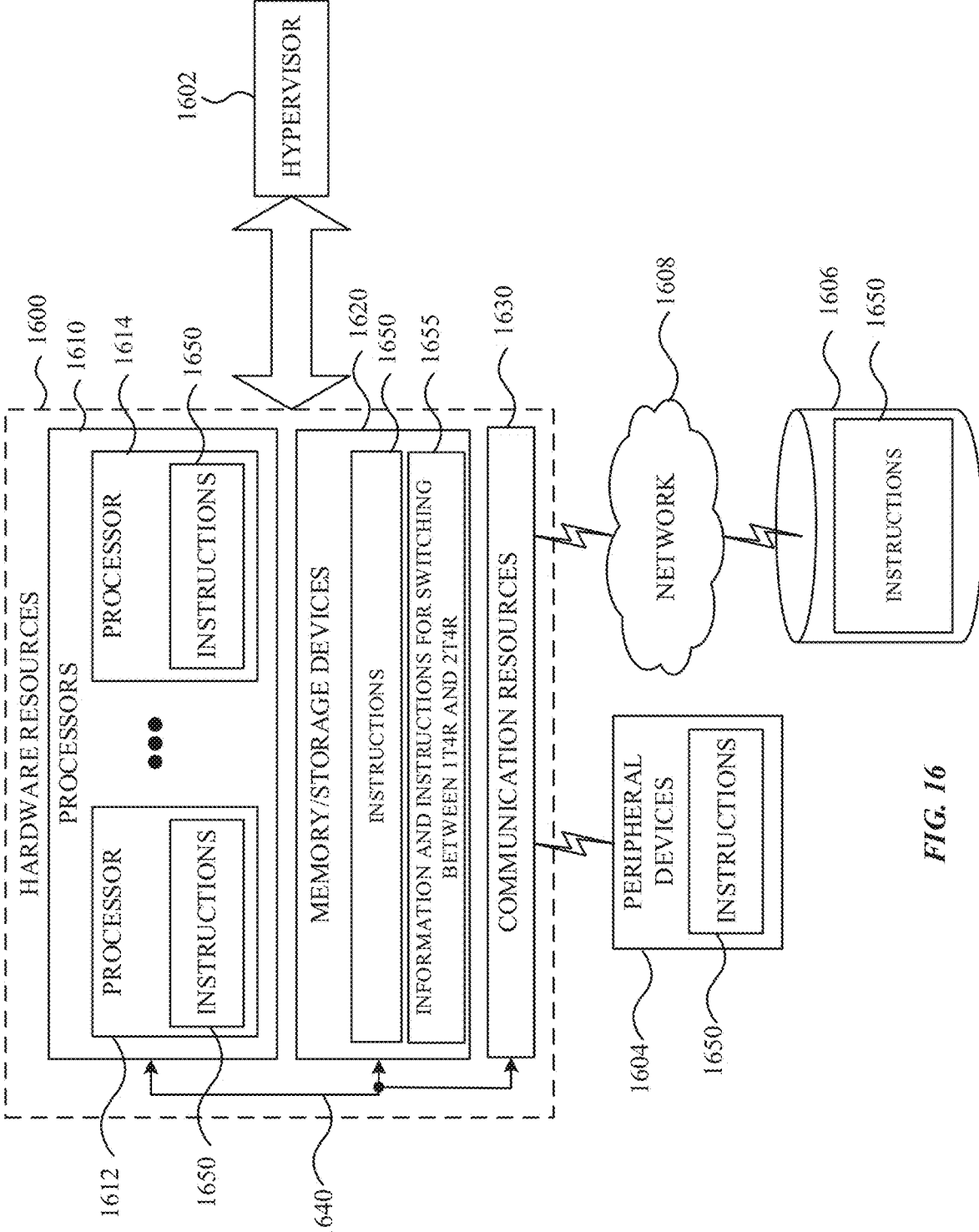
FIG. 16 is a block diagram illustrating components, according to one or more implementations described herein, able to read instructions from a machine-readable or computer-readable medium (e.g., a non-transitory machine-readable storage medium) and perform any one or more of the methodologies discussed herein.

FIG. 16 is a block diagram illustrating components, according to some example implementations, able to read instructions from a machine-readable or computer-readable medium (e.g., a non-transitory machine-readable storage medium) and perform any one or more of the methodologies discussed herein. Specifically, FIG. 16 shows a diagrammatic representation of hardware resources 1600 including one or more processors (or processor cores) 1610, one or more memory/storage devices 1620, and one or more communication resources 1630, each of which may be communicatively coupled via a bus 1640. For implementations where node virtualization (e.g., NFV) is utilized, a hypervisor 1602 may be executed to provide an execution environment for one or more network slices/sub-slices to utilize the hardware resources 1600

The processors 1610 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1612 and a processor 1614.

The memory/storage devices 1620 may include main memory, disk storage, or any suitable combination thereof. The memory/storage devices 1620 may include, but are not limited to any type of volatile or non-volatile memory such as dynamic random-access memory (DRAM), static random-access memory (SRAM), erasable programmable read-only memory (EPROM), electrically erasable programmable read-only memory (EEPROM), Flash memory, solid-state storage, etc.

In some implementations, memory/storage devices 1620 receive and/or store information and instructions 1655 for performing communications using, and switching between, 1T4R and 2T4R as described herein. For example, UE 210 and base station 222 may communicate with one another using 2T4R communications. UE 110 and/or base station 222 may detect and evaluate a signal quality trigger and/or condition relating to switching from T2R4 communications to T1R4 communications. The trigger and/or condition may correspond to a channel or radio frequency (RF) quality, conflicting or problematic band combinations being used in an NSA scenario, whether DDS SIM or non-DDS SIM is being used in a DSDA scenario, etc. Based on the evaluation, UE 210 and base station 222 may continue using T2R4 communications or switch to T1R4 communications. Switching from T2R4 communications to T1R4 communications may, for example, improve the quality and reliability of SRS from UE 210 and in turn enhance an ability of base station 222 for channel estimation and ensure proper quality and DL performance.

The communication resources 1630 may include interconnection or network interface components or other suitable devices to communicate with one or more peripheral devices 1604 or one or more databases 1606 via a network 1608. For example, the communication resources 1630 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1650 may comprise software, a program, an application, an applet, an app, or other executable code for causing at least any of the processors 1610 to perform any one or more of the methodologies discussed herein. The instructions 1650 may reside, completely or partially, within at least one of the processors 1610 (e.g., within the processor's cache memory), the memory/storage devices 1620, or any suitable combination thereof. Furthermore, any portion of the instructions 1650 may be transferred to the hardware resources 1600 from any combination of the peripheral devices 1604 or the databases 1606. Accordingly, the memory of processors 1610, the memory/storage devices 1620, the peripheral devices 1604, and the databases 1606 are examples of computer-readable and machine-readable media.

Examples herein can include subject matter such as a method, means for performing acts or blocks of the method, at least one machine-readable medium including executable instructions that, when performed by a machine (e.g., a processor (e.g., processor, etc.) with memory, an application-specific integrated circuit (ASIC), a field programmable gate array (FPGA), or the like) cause the machine to perform acts of the method or of an apparatus or system for concurrent communication using multiple communication technologies according to implementations and examples described.

In example 1, which may also include one or more of the examples described herein, a base station may comprise: a memory; and one or more processors configured to, when executing instructions stored in the memory, cause the base station to: configure a user equipment (UE) for transmitting sounding references signals (SRSs) via 2T4R communications; determine a signal quality condition corresponding to the SRSs; and cause the UE to transmit SRSs via 1T4R communications in response to the signal quality threshold.

In example 2, which may also include one or more of the examples described herein, the signal quality condition comprises an SRS transmission (Tx) power exceeding an SRS Tx power threshold. In example 3, which may also include one or more of the examples described herein, the signal quality condition comprises an SRS transmission (Tx) power exceeding an SRS Tx power threshold. In example 4, which may also include one or more of the examples described herein, the signal quality condition comprises a poor radio frequency (RF) condition of the UE. The base station is to enter into an evaluation period to evaluate the signal quality condition.

In example 5, which may also include one or more of the examples described herein, the base station is to continue communicating with the UE via 2T1 R communications when the signal quality condition is not detected. In example 6, which may also include one or more of the examples described herein, cause the UE to transmit SRSs via 1T4R communication to increase a SRS Tx power by 3 decibels (dB). In example 7, which may also include one or more of the examples described herein, the one or more processors are configured to cause the base station to: determine that the base station and the UE are capable of 2T4R communications and 1T4R communications.

In example 8, which may also include one or more of the examples described herein, a UE may comprise: a memory; and one or more processors configured to, when executing instructions stored in the memory, cause the UE to: communicate sounding references signals (SRSs) to a base station via 2T4R communications; receive, from the base station, instructions for switching from 2T4R communications to 1T4R communications; and communicate, in response to the instructions, SRSs to the base station via 2T4R communications.

In example 9, which may also include one or more of the examples described herein, the instructions are received in response to a signal to noise and interference ratio (SINR) of the SRSs being below an SRS SINR threshold. In example 10, which may also include one or more of the examples described herein, the instructions are received in response to an SRS transmission (Tx) power exceeding an SRS Tx power threshold. In example 11, which may also include one or more of the examples described herein, the instructions are received in response to the UE being in a poor radio frequency (RF) condition with respect to the base station. In example 12, which may also include one or more of the examples described herein, the one or more processors are configured to cause the UE to: provide the base station with UE capability information, the UE capability information indicating an ability of the UE to switch between 2T4R communications and 1T4R communications.

In example 13, which may also include one or more of the examples described herein, a UE may comprise: a memory; and one or more processors configured to, when executing instructions stored in the memory, cause the UE to: communicate sounding references signals (SRSs) to one or more base stations in a non-standalone (NSA) network environment using 2T4R communications, the NSA network environment comprising a master cell group (MCG) and a secondary cell group (SCG); determine that a downlink (DL) slot performance is impacted by the 2T4R communications; report a problematic band combination to the MCG; and switch from 2T4R communications to 1T4R communications.

In example 14, which may also include one or more of the examples described herein, the UE is configured to continue using 2T4R communications when the DL slot performance is not impacted by the 2T4R communications. In example 15, which may also include one or more of the examples described herein, the DL slot performance is impacted when a DL slot performance is less than a DL slot performance threshold.

In example 16, which may also include one or more of the examples described herein, the UE enters an evaluation period in response to determining that an NSA band combination is problematic for 2T4R communications. In example 17, which may also include one or more of the examples described herein, the UE determines that the NSA band combination is problematic for 2T4R communications based on locally stored information regarding problematic NSA band combinations. In example 18, which may also include one or more of the examples described herein, the UE is configured to continue using 2T4R communications when the NSA band combination is not problematic for 2T4R communications.

In example 19, which may also include one or more of the examples described herein, a base station may comprise: a memory; and one or more processors configured to, when executing instructions stored in the memory, cause the base station to: determine that a band combination for a non-standalone (NSA) of a user equipment (UE) is problematic for sounding references signals (SRSs) using 2T4R communications; enter an evaluation period upon detecting the band combination; determine that the impact of the band combination in greater than a performance threshold; and switch to 1T4R communications in response to the impact of the band combination being greater than the performance threshold.

In example 20, which may also include one or more of the examples described herein, the base station is configured to continue using 2T4R communications when a DL slot performance is not impacted by the 2T4R communications. In example 21, which may also include one or more of the examples described herein, the DL slot performance is impacted when a DL slot performance is less than a DL slot performance threshold. In example 22, which may also include one or more of the examples described herein, the base station determines that the band combination is problematic for 2T4R communications based on locally stored information regarding problematic NSA band combinations. In example 23, which may also include one or more of the examples described herein, the base station is configured to continue using 2T4R communications when the NSA band combination is not problematic for 2T4R communications.

In example 24, which may also include one or more of the examples described herein, a UE may comprise: a memory; and one or more processors configured to, when executing instructions stored in the memory, cause the UE to: communicate, in a dual subscriber identity module (SIM) dual active (DSDA) scenario, sounding references signals (SRSs) to a base station using 2T4R communications; determine that a band combination used for DSDA is impacted by the 2T4R communications; and communicate, in response to determining that the DSDA is impacted, SRS using the 2T4R communications while skipping one SRS transmission (Tx) port of the 2T4R communications.

In example 25, which may also include one or more of the examples described herein, the UE is to communicate a RANK=4 indication to the base station while skipping one SRS port. In example 26, which may also include one or more of the examples described herein, the UE is to continue using 2T4R communications for SRSs when the band combination used for DSDA is not impacted by the 2T4R communications.

In example 27, which may also include one or more of the examples described herein, the UE is to communicate a RANK=4 indication to the base station while implementing the 2T4R communications. In example 28, which may also include one or more of the examples described herein, the UE is to switch one Tx antenna from a dedicated data subscription (DDS) SIM to a non-DDS SIM while a non-DDS service is active. In example 29, which may also include one or more of the examples described herein, the UE is to continue skipping the one SRS Tx port after the base station switches to 2T4R communications.

In example 30, which may also include one or more of the examples described herein, a base station may comprise: a memory; and one or more processors configured to, when executing instructions stored in the memory, cause the base station to: configure a user equipment (UE) to transmit sounding references signals (SRSs) using 2T4R communications; receive, from the UE, a RANK=4 report regarding the 2T4R communications; detect, an SRS transmission (Tx) port of the UE, without power; and switch from 2T4R communications to 1T4R communications. In example 31, which may also include one or more of the examples described herein, the UE is configured to communicate via a dual subscriber identity module (SIM) dual active (DSDA) scenario.

In example 32, which may also include one or more of the examples described herein, the base station is to receive the RANK=4 report from the UE while detecting the SRS Tx port without power. In example 33, which may also include one or more of the examples described herein, the base station is to switch from 2T4R communications to 1T4R communications while the UE continues using 2T4R communications. In example 34, which may also include one or more of the examples described herein, the base station is to switch from 2T4R communications to 1T4R communications in response to detecting two, of four, SRS ports, of the 2T4R communications, without power.

In example 33, which may also include one or more of the examples described herein, the signal quality condition comprises a signal to noise and interference ratio (SINR) of the SRSs being below an SRS SINR threshold. In example 34, which may also include one or more of the examples described herein, a first antenna configuration comprises 2 transmission and 4 reception antenna configuration (2T4R) communications, and a second antenna configuration comprise 1 transmission and 4 reception antenna configuration (1T4R) communications.

The above description of illustrated examples, implementations, aspects, etc., of the subject disclosure, including what is described in the Abstract, is not intended to be exhaustive or to limit the disclosed aspects to the precise forms disclosed. While specific examples, implementations, aspects, etc., are described herein for illustrative purposes, various modifications are possible that are considered within the scope of such examples, implementations, aspects, etc., as those skilled in the relevant art can recognize.

In this regard, while the disclosed subject matter has been described in connection with various examples, implementations, aspects, etc., and corresponding Figures, where applicable, it is to be understood that other similar aspects can be used or modifications and additions can be made to the disclosed subject matter for performing the same, similar, alternative, or substitute function of the subject matter without deviating therefrom. Therefore, the disclosed subject matter should not be limited to any single example, implementation, or aspect described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given application.

As used herein, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description or the claims, such terms are intended to be inclusive in a manner similar to the term "comprising." Additionally, in situations wherein one or more numbered items are discussed (e.g., a "first X", a "second X", etc.), in general the one or more numbered items can be distinct, or they can be the same, although in some situations the context may indicate that they are distinct or that they are the same.

It is well understood that the use of personally identifiable information should follow privacy policies and practices that are generally recognized as meeting or exceeding industry or governmental requirements for maintaining the privacy of users. In particular, personally identifiable information data should be managed and handled to minimize risks of unintentional or unauthorized access or use, and the nature of authorized use should be clearly indicated to users.

What is claimed is:

1. A base station, comprising:
   a memory; and
   one or more processors configured to, when executing instructions stored in the memory, cause the base station to:
      configure a user equipment (UE) for transmitting sounding reference signals (SRSs) via a first antenna configuration;
      determine a signal quality condition corresponding to the SRSs, the signal quality condition indicating degraded SRS quality meeting a threshold; and
      configure the UE to transmit the SRSs via a second antenna configuration in response to the signal quality condition,
      wherein for transmission of the SRSs, the second antenna configuration uses fewer active transmit antennas and a higher per-active-transmit-antenna SRS transmission power than the first antenna configuration.

2. The base station of claim 1, wherein the first antenna configuration comprises 2 transmission and 4 reception (2T4R) antenna configuration, and the second antenna configuration comprises 1 transmission and 4 reception (1T4R) antenna configuration.

3. The base station of claim 1, wherein the signal quality condition comprises a signal to noise and interference ratio (SINR) of the SRSs being below an SRS SINR threshold.

4. The base station of claim 1, wherein the signal quality condition comprises a sum of actual SRS transmission (Tx) power of all active transmit antennas exceeding a UE SRS Tx power threshold.

5. The base station of claim 1, wherein, after determining a signal to noise and interference ratio (SINR) of the SRSs meeting an SRS SINR threshold, the base station is to enter into an evaluation period to evaluate RF condition or downlink performance meeting a threshold, and wherein the signal quality condition is satisfied based on the RF condition or the downlink performance.

6. The base station of claim 1, wherein the signal quality condition comprises a poor radio frequency (RF) condition of the UE, the poor RF condition being determined based on at least one of a pathloss relative to a pathloss threshold or a reference signal received power (RSRP) relative to an RSRP threshold, and wherein the poor RF condition is optionally associated with a problematic non-standalone (NSA) band combination.

7. The base station of claim 1, wherein the UE operates in a dual-SIM dual-active (DSDA) mode, and wherein the signal quality condition is satisfied based on detection that, via the first antenna configuration, at least one SRS transmit port is transmitted without transmission power based on a transmit antenna being occupied for a second subscriber identity module (SIM).

8. The base station of claim 1, wherein causing the UE to transmit the SRSs via the second antenna configuration increases a SRS Tx power by 3 decibels (dB).

9. The base station of claim 1, wherein the one or more processors are configured to cause the base station to determine that the base station and the UE are capable of the first antenna configuration and the second antenna configuration.

10. A user equipment (UE), comprising:
   a memory; and
   one or more processors configured to, when executing instructions stored in the memory, cause the UE to:
      transmit, to a base station, sounding reference signals (SRSs) via a first antenna configuration; and
      receive, from the base station, an instruction for switching from the first antenna configuration to a second antenna configuration, the instruction being based on a signal quality condition indicating degraded SRS quality meeting a threshold; and
      transmit, to the base station in response to the instruction, the SRSs via a the second antenna configuration, wherein for transmission of the SRSs, the second antenna configuration uses fewer active transmit antennas and a higher per-active-transmit-antenna SRS transmission power than the first antenna configuration.

11. The UE of claim 10, wherein the first antenna configuration comprises a 2 transmission and 4 reception (2T4R) antenna configuration, and the second antenna configuration comprises a 1 transmission and 4 reception (1T4R) antenna configuration.

12. The UE of claim 10, wherein the instructions are received in response to a signal-to-interference-and-noise ratio (SINR) of the SRSs being below an SRS SINR threshold.

13. The UE of claim 10, wherein the instructions are received in response to a sum of actual SRS transmission (Tx) power of all active transmit antennas exceeding a UE Tx power threshold.

14. The UE of claim 10, wherein the instructions are received after an evaluation period during which the base station evaluates a poor radio frequency (RF) condition or downlink performance, in addition to being based on the signal quality condition.

15. The UE of claim 10, wherein the one or more processors are configured to cause the UE to provide the base station with UE capability information, the UE capability information indicating an ability of the UE to switch between first antenna configuration communications and second antenna configuration communications.

16. A base station, comprising:
a memory; and
one or more processors configured to, when executing instructions stored in the memory, cause the base station to:
determine that a band combination is problematic for a user equipment (UE) for sounding reference signals (SRSs) using 2 transmission and 4 reception (2T4R) communications;
enter an evaluation period upon determining that the band combination is problematic for the SRSs using 2T4R communications;
determine that a performance metric of the band combination is greater than a performance threshold; and switch to 1 transmission and 4 reception (1T4R) communications in response to the performance metric of the band combination being greater than the performance threshold, wherein for transmission of the SRSs, the 1T4R communications use fewer active transmit antennas and a higher per-active-transmit-antenna SRS transmission power than the 2T4R communications.

17. The base station of claim 16, wherein the base station is configured to continue using 2T4R communications when a downlink (DL) slot performance is not impacted by the 2T4R communications, wherein the DL slot performance is impacted when meeting a DL slot performance threshold.

18. The base station of claim 16, wherein the base station determines that the band combination is problematic for 2T4R communications based on locally stored information regarding a problematic non-standalone (NSA) band combination.

19. The base station of claim 18, wherein the base station is configured to continue using 2T4R communications when the NSA band combination is not problematic for 2T4R communications.

20. The UE of claim 10, wherein the UE operates in a dual SIM dual active (DSDA) mode and skips transmission on at least one SRS transmit port via the first antenna configuration due to a transmit antenna being occupied for a second subscriber identity module (SIM), and wherein the instructions are received in response to the base station detecting that the at least one SRS transmit port is transmitted without transmission power.

\* \* \* \* \*